United States Patent
Chin et al.

(10) Patent No.: US 12,262,439 B2
(45) Date of Patent: Mar. 25, 2025

(54) METHODS FOR DATA TRANSMISSION AND USER EQUIPMENT USING THE SAME

(71) Applicant: SHARP KABUSHIKI KAISHA, Sakai (JP)

(72) Inventors: Heng-Li Chin, Taipei (TW); Hsin-Hsi Tsai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 302 days.

(21) Appl. No.: 17/565,423

(22) Filed: Dec. 29, 2021

(65) Prior Publication Data

US 2022/0210860 A1 Jun. 30, 2022

Related U.S. Application Data

(60) Provisional application No. 63/131,441, filed on Dec. 29, 2020.

(51) Int. Cl.
*H04W 76/27* (2018.01)
*H04W 72/23* (2023.01)
*H04W 76/38* (2018.01)

(52) U.S. Cl.
CPC .......... *H04W 76/27* (2018.02); *H04W 72/23* (2023.01); *H04W 76/38* (2018.02)

(58) Field of Classification Search
None
See application file for complete search history.

(56) References Cited

U.S. PATENT DOCUMENTS

| | | |
|---|---|---|
| 2013/0195060 A1 | 8/2013 | Park et al. |
| 2019/0021109 A1 | 1/2019 | Yi et al. |
| 2019/0253197 A1 | 8/2019 | Babaei et al. |
| 2020/0351037 A1 | 11/2020 | Lee et al. |
| 2020/0404697 A1 | 12/2020 | Yang et al. |
| 2021/0227575 A1 | 7/2021 | Ou et al. |
| 2021/0337625 A1 | 10/2021 | Tsai et al. |
| 2022/0078875 A1* | 3/2022 | Ou ....................... H04W 76/27 |

(Continued)

OTHER PUBLICATIONS

3GPP TS 38.331, "3rd Generation Partnership Project; Technical Specification Group Radio Access Network; NR; Radio Resource Control (RRC) protocol specification (Release 16)", Technical Specification, V16.2.0 (Sep. 2020).

(Continued)

*Primary Examiner* — Clemence S Han
(74) *Attorney, Agent, or Firm* — ScienBiziP, P.C.

(57) ABSTRACT

A method performed by a user equipment (UE) for data transmission is provided. The method includes transmitting, in radio resource control (RRC) inactive state, an RRC message to a base station for requesting an RRC state transition on an uplink (UL) resource of a configured grant (CG) configuration; transmitting first uplink data to the base station on an UL resource of the CG configuration; starting a timer upon transmitting on an UL resource of the CG configuration; and monitoring a response from the base station while the timer is running. The timer is configured to stop in response to at least one stop condition, and the at least one stop condition includes the response that responds to the RRC message for requesting the RRC state transition is received. In addition, a UE using the method is also provided.

14 Claims, 6 Drawing Sheets

(56) References Cited

U.S. PATENT DOCUMENTS

| | | | | |
|---|---|---|---|---|
| 2022/0264589 A1* | 8/2022 | Sun | ................... | H04W 72/535 |
| 2023/0284231 A1* | 9/2023 | Lin | ................... | H04W 76/27 |
| | | | | 370/252 |
| 2023/0284289 A1* | 9/2023 | Watts | ................... | H04W 48/20 |
| | | | | 370/329 |
| 2023/0379860 A1* | 11/2023 | Rao | ................... | G01S 5/01 |
| 2023/0388919 A1* | 11/2023 | Wu | ................... | H04W 48/20 |
| 2023/0397215 A1* | 12/2023 | Shi | ................... | H04W 72/23 |

OTHER PUBLICATIONS

3GPP TS 38.213, "3rd Generation Partnership Project; Technical Specification Group Radio Access Network; NR; Physical layer procedures for control (Release 16)", Technical Specification, V16.3.0 (Sep. 2020).

3GPP TS 38.300, "3rd Generation Partnership Project; Technical Specification Group Radio Access Network; NR; NR and NG-RAN Overall Description; Stage 2 (Release 16)", Technical Specification, V16.2.0 (Jul. 2020).

3GPP TS 38.321, "3rd Generation Partnership Project; Technical Specification Group Radio Access Network; NR; Medium Access Control (MAC) protocol specification (Release 16)", Technical Specification, V16.2.0 (Sep. 2020).

3GPP TS 38.214, "3rd Generation Partnership Project; Technical Specification Group Radio Access Network; NR; Physical layer procedures for data (Release 16)", Technical Specification, V16.3.0 (Sep. 2020).

3GPP TS 38.212, "3rd Generation Partnership Project; Technical Specification Group Radio Access Network; NR; Multiplexing and channel coding (Release 16)", Technical Specification, V16.3.0 (Sep. 2020).

Khlass et al. "On the flexible and performance-enhanced radio resource control for 5G NR networks." 2019 IEEE 90th Vehicular Technology Conference (VTC2019-Fall), IEEE, 2019. Retrieved on Mar. 5, 2022 (Mar. 5, 2022).

* cited by examiner

METHODS FOR DATA TRANSMISSION AND USER EQUIPMENT USING THE SAME

CROSS-REFERENCE TO RELATED APPLICATION(S)

The present disclosure claims the benefit of and priority to U.S. Provisional Patent Application Ser. No. 63/131,441 ("the '441 provisional"), filed on Dec. 29, 2020, entitled "METHOD AND APPARATUS TO HANDLE UPLINK TRANSMISSION SKIPPING IN RRC_INACTIVE." The content(s) of the '441 provisional are fully incorporated herein by reference for all purposes.

FIELD

The present disclosure generally relates to wireless communications, and more specifically, to methods for data transmission in a radio resource control (RRC) inactive state and user equipment (UE) using the same.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method for data transmission in an RRC inactive state and a UE using the same.

In a first aspect of the present application, a method performed by a UE for data transmission is provided. The method includes: transmitting, in an RRC inactive state, an RRC message to a base station for requesting an RRC state transition on an uplink (UL) resource of a configured grant (CG) configuration; transmitting first uplink data to the base station on an UL resource of the CG configuration; starting a timer upon transmitting on an UL resource of the CG configuration; and monitoring a response from the base station while the timer is running. The timer is configured to stop in response to at least one stop condition, and the at least one stop condition includes the response that responds to the RRC message for requesting the RRC state transition is received.

In an implementation of the first aspect, the method further includes: receiving an RRC release message including the CG configuration; and transitioning from an RRC connected state to the RRC inactive state according to the RRC release message.

In another implementation of the first aspect, monitoring the response from the base station while the timer is running includes: monitoring a physical downlink control channel (PDCCH) based on the transmission of the uplink data while the timer is running.

In another implementation of the first aspect, monitoring the response from the base station while the timer is running further includes: receiving the PDCCH scheduling a physical downlink shared channel (PDSCH); and monitoring the PDSCH for monitoring the response.

In another implementation of the first aspect, the timer is configured to restart in response to at least one restart condition, and the at least one restart condition includes: the first uplink data is retransmitted on a physical uplink shared channel (PUSCH) scheduled via the PDCCH.

In another implementation of the first aspect, the at least one stop condition further includes: an uplink grant indicating a new transmission is received via the PDCCH.

In another implementation of the first aspect, the timer is configured to restart in response to at least one restart condition, and the at least one restart condition includes: second uplink data is transmitted on an UL resource of the CG configuration.

In another implementation of the first aspect, the response responding to the RRC message for requesting the RRC state transition includes at least one of an RRC resume message, an RRC release message, RRC setup message and an RRC reject message.

In another implementation of the first aspect, the RRC message for requesting the RRC state transition includes an RRC resume request message.

In another implementation of the first aspect, the method further includes: determining the transmission on the UL resource of the CG configuration corresponding to the timer fails in a case that the timer expires.

In a second aspect of the present application, a UE is provided. The UE includes a processing circuitry, a transceiver coupled to the processing circuitry and a memory coupled to the processing circuitry. The memory stores at least one computer-executable program that, when executed by the processing circuitry, causes the processing circuitry to: in an RRC inactive state, transmit, using the transceiver, an RRC message to a base station for requesting an RRC state transition on a UL resource of a CG configuration; transmit, using the transceiver, first uplink data to the base station on an UL resource of the CG configuration; start a timer upon the transceiver transmits on an UL resource of the CG configuration; and monitor, using the transceiver, a response from the base station while the timer is running. The timer is configured to stop in response to at least one stop condition, and the at least one stop condition includes the response that responds to the RRC message for requesting the RRC state transition is received using the transceiver.

In an implementation of the second aspect, the processing circuitry is further caused to: receive, using the transceiver, an RRC release message including the CG configuration; and transition from an RRC connected state to the RRC inactive state according to the RRC release message.

In another implementation of the second aspect, the transceiver monitoring the response from the base station while the timer is running includes: monitoring a PDCCH based on the transmission of the uplink data while the timer is running.

In another implementation of the second aspect, the transceiver monitoring the response from the base station while the timer is running further includes: receiving the PDCCH scheduling a PDSCH; and monitoring the PDSCH for monitoring the response.

In another implementation of the second aspect, the timer is configured to restart in response to at least one restart condition, and the at least one restart condition includes: the first uplink data is retransmitted, using the transceiver, on a PUSCH scheduled via the PDCCH.

In another implementation of the second aspect, the at least one stop condition further includes: an uplink grant indicating a new transmission is received, using the transceiver, via the PDCCH.

In another implementation of the second aspect, the timer is configured to restart in response to at least one restart condition, and the at least one restart condition includes: second uplink data is transmitted, using the transceiver, on an UL resource of the CG configuration.

In another implementation of the second aspect, the response responding to the RRC message for requesting the RRC state transition includes at least one of an RRC resume message, an RRC release message, RRC setup message and an RRC reject message.

In another implementation of the second aspect, the RRC message for requesting the RRC state transition includes an RRC resume request message.

In another implementation of the second aspect, the processing circuitry is further caused to: determine the transmission on the UL resource of the CG configuration corresponding to the timer fails in a case that the timer expires.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
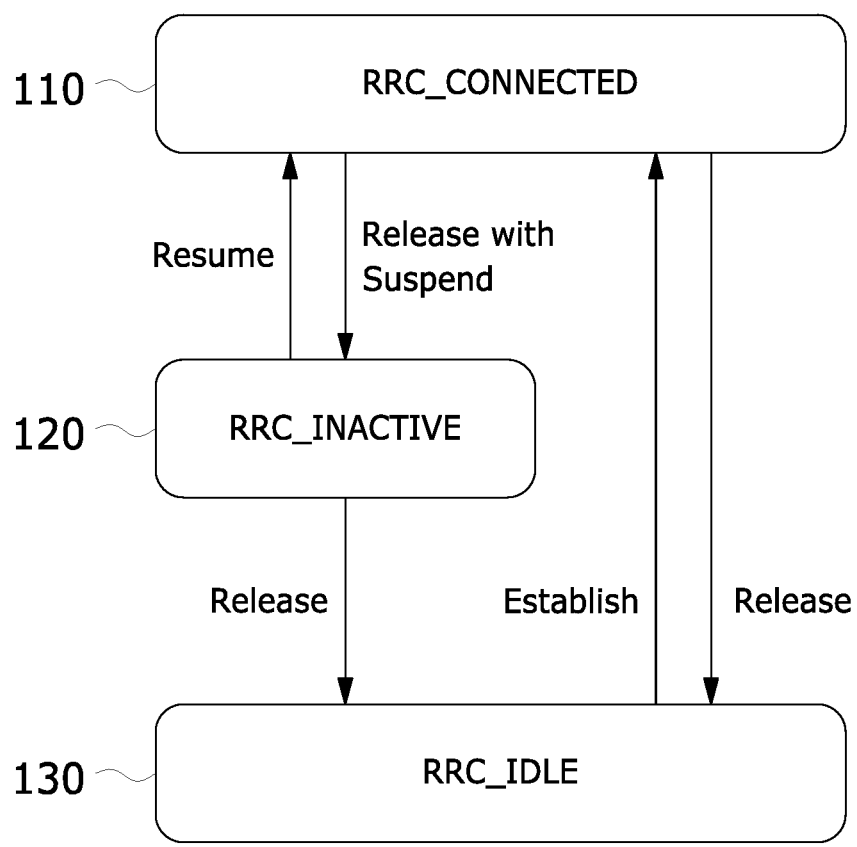
FIG. 1 is a schematic diagram illustrating an RRC state machine according to an example implementation of the present application.

The terms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th generation |
| ACK | Acknowledge |
| BA | Bandwidth Adaptation |

-continued

| Abbreviation | Full name |
| --- | --- |
| BF | Beam Failure |
| BFD | Beam Failure Detection |
| BFI | Beam Failure Instance |
| BFR | Beam Failure Recovery |
| BFRQ | Beam Failure Recovery Request |
| BFRR | Beam Failure Recovery Response |
| BS | Base Station |
| BSR | Buffer Status Report |
| BWP | Bandwidth Part |
| CA | Carrier Aggregation |
| CC | Component Carriers |
| CCA | Clear Channel Assessment |
| CE | Control Element |
| CG | Configured Uplink Grant |
| CSI | Channel State Information |
| CSI-RS | Channel State Information based Reference Signal |
| CQI | Channel Quality Indicator |
| C-RNTI | Cell Radio Network Temporary Identifier |
| CS-RNTI | Configured Scheduling Radio Network Temporary Identifier |
| CORESET | Control Resource Set |
| COT | Channel Occupancy Time |
| DC | Dual Connectivity |
| DCI | Downlink Control Information |
| DCP | DCI with CRC scrambled by PS-RNTI |
| DFI | Downlink Feedback Information |
| DL | Downlink |
| DRX | Discontinuous Reception |
| FBE | Frame Based Equipment |
| FFP | Fixed Frame Period |
| GC-PDCCH | Group Common Physical Downlink Control Channel |
| HARQ | Hybrid Automatic Repeat Request |
| ID | Identity |
| IE | Information Element |
| IIoT | Industrial Internet of Things |
| L1 | Layer 1 |
| L2 | Layer 2 |
| LAA | Licensed Assisted Access |
| LBT | Listen Before Talk |
| LCID | Logical Channel Identity |
| LSB | Least Significant Bit |
| LTE | Long Term Evolution |
| MAC | Medium Access Control |
| MCG | Master Cell Group |
| MIMO | Multi-input Multi-output |
| MCS-C-RNTI | Modulation Coding Scheme Cell Radio Network Temporary Identifier |
| MSB | Most Significant Bit |
| Msg | Message |
| NACK | Negative Acknowledge |
| NAS | Non-Access Stratum |
| NBI | New Beam Identification |
| NDI | New Data Indicator |
| NR | New RAT/Radio |
| NR-U | New Radio Unlicensed |
| NUL | Normal Uplink Carrier |
| NW | Network |
| PBCH | Physical Broadcast Channel |
| PCell | Primary Cell |
| PDCCH | Physical Downlink Control Channel |
| PDSCH | Physical Downlink Shared Channel |
| PDCP | Packet Data Convergence Protocol |
| PDU | Protocol Data Unit |
| PHY Layer | Physical Layer |
| PRACH | Physical Random Access Channel |
| PS | Power Saving |
| PSCell | Primary SCell |
| PUCCH | Physical Uplink Control Channel |
| PUSCH | Physical Uplink Shared Channel |
| PUR | Preconfigured Uplink Resource |
| QoS | Quality of Service |
| RA | Random Access |
| RACH | Random Access Channel |
| RAN | Random Access Network |
| RAR | Random Access Response |
| Rel | Release |
| RF | Radio Frequency |

-continued

| Abbreviation | Full name |
|---|---|
| RLF | Radio Link Control |
| RMSI | Remaining Minimum System Information |
| RNTI | Radio Network Temporary Identifier |
| RRC | Radio Resource Control |
| RRM | Radio Resource Management |
| RS | Reference Signal |
| RSRP | Reference Signal Received Power |
| RV | Redundancy Version |
| Rx | Reception |
| SCell | Secondary Cell |
| SCG | Secondary Cell Group |
| SCS | SubCarrier Spacing |
| SDAP | Service Data Adaptation Protocol |
| SDU | Service Data Unit |
| SDT | Small Data Transmission |
| SINR | Signal to Interference plus Noise Ratio |
| SR | Scheduling Request |
| SRS | Sounding Reference Signal |
| SS | Search Space |
| SSB | Synchronization Signal Block |
| SUL | Supplementary Uplink Carrier |
| SpCell | Special Cell |
| TB | Transport Block |
| TBS | Transport Block Size |
| TCI | Transmission Configuration Indication |
| TR | Technical Report |
| TRP | Transmission/Reception Point |
| TS | Technical Specification |
| TX | Transmission |
| UCI | Uplink Control Information |
| UE | User Equipment |
| UL | Uplink |
| URLLC | Ultra Reliable Low Latency Communication |
| WG | Working Group |
| WI | Working Item |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

A bandwidth part (BWP) switching for a Serving Cell may be used to activate an inactive BWP and deactivate an active BWP at a time. The BWP switching may be controlled by the PDCCH indicating a downlink assignment or an uplink grant, by the bwp-InactivityTimer via RRC signaling, or by the MAC entity itself upon initiation of Random Access procedure or upon detection of consistent LBT failure on SpCell. Upon RRC (re-) configuration of firstActiveDownlinkBWP-Id and/or firstActiveUplinkBWP-Id for SpCell or activation of an SCell, the DL BWP indicated by firstActiveDownlinkBWP-Id and/or the UL BWP indicated by firstActiveUplinkBWP-Id may be activated without receiving PDCCH indicating a downlink assignment or an uplink grant. The active BWP for a Serving Cell may be indicated by either RRC or PDCCH. For unpaired spectrum, a DL BWP has the same frequency range as a UL BWP, and the BWP switching is common for both UL and DL.

For each activated Serving Cell configured with a BWP, the MAC entity shall:
1>if a BWP is activated and the active DL BWP for the Serving Cell is not a dormant BWP:
  2>transmit on Uplink Shared Channel (UL-SCH) on the BWP;
  2>transmit on RACH on the BWP, if PRACH occasions are configured;
  2>monitor the PDCCH on the BWP;
  2>transmit PUCCH on the BWP, if configured;
  2>report CSI for the BWP;
  2>transmit SRS on the BWP, if configured;
  2>receive Downlink Shared Channel (DL-SCH) on the BWP;
  2>(re-)initialize any suspended configured uplink grants of configured grant Type 1 on the active BWP according to the stored configuration, if any, and to start in the symbol according to rules in clause 5.8.2 of 3GPP TS 38.321 V16.2.0; and
1> if a BWP is deactivated:
  2>not transmit on UL-SCH on the BWP;
  2>not transmit on RACH on the BWP;
  2>not monitor the PDCCH on the BWP;
  2>not transmit PUCCH on the BWP;
  2>not report CSI for the BWP;
  2>not transmit SRS on the BWP;
  2>not receive DL-SCH on the BWP;

2>clear any configured downlink assignment and configured uplink grant of configured grant Type 2 on the BWP;

2>suspend any configured uplink grant of configured grant Type 1 on the inactive BWP.

In NR Rel-15 and Rel-16, the network may dynamically allocate resources to UEs in an RRC connected state (also referred to as an RRC_CONNECTED state) via the C-RNTI on PDCCH(s). A UE may always monitor the PDCCH(s) in order to find possible grants for uplink transmission when its downlink reception is enabled (e.g., activity governed by DRX when configured). When CA is configured, the same C-RNTI may apply to all serving cells.

In NR Rel-15 and Rel-16, the network may allocate uplink resources for the initial transmissions to the UEs in the RRC_CONNECTED state via configured uplink grant. In some implementations, there are two types of configured uplink grants: Type 1 and Type 2. For Type 1, an uplink grant is provided by RRC and stored as configured uplink grant. For Type 2, an uplink grant is provided by PDCCH and stored or cleared as configured uplink grant based on L1 signaling indicating configured uplink grant activation or deactivation. When a L1 signaling indicates activation of a configured uplink grant type 2, the uplink grant of the configured uplink grant type 2, as indicated by the same L1 signaling, may be stored by the UE. Oppositely, when a L1 signaling indicates deactivation of a configured uplink grant type 2, the uplink grant of the configured uplink grant type 2, as indicated by the same L1 signaling, may be cleared by the UE.

Type 1 and Type 2 are configured by RRC per Serving Cell and per BWP. In some instances, for configured uplink grant type 1, the UL grant and other configured uplink grant parameters (e.g., periodicity of UL transmission indicated by the UL grant of the corresponding configured uplink grant type 1, and without further RRC-based UL grant indication) may all be configured by RRC per serving cell and per BWP. In some instances, for configured uplink grant type 2, the configured uplink grant parameters other than the UL grant (e.g., periodicity of UL transmission indicated by the UL grant of the corresponding configured uplink grant type 2, and without further L1-based UL grant indication) may be configured by the RRC per serving cell and per BWP. Multiple configurations can be active simultaneously only on different Serving Cells. For Type 2, activation and deactivation are independent among the Serving Cells. For the same Serving Cell, the MAC entity is configured with either Type 1 or Type 2.

In some implementations, when the configured grant Type 1 is configured, the following parameters may be configured in RRC:

cs-RNTI: CS-RNTI for retransmission;
periodicity: periodicity of the configured grant Type 1;
timeDomainOffset: offset of a resource with respect to System Frame Number (SFN)=0 in time domain;
timeDomainAllocation: allocation of configured uplink grant in time domain which contains startSymbolAndLength (i.e., SLIV in 3GPP TS 38.214 V16.3.0); and
nrofHARQ-Processes: the number of HARQ processes for configured grant.

In some implementations, when the configured grant Type 2 is configured, the following parameters may be configured in RRC:

cs-RNTI: CS-RNTI for retransmission;
periodicity: periodicity of the configured grant Type 2; and nrofHARQ-Processes: the number of HARQ processes for configured grant.

Upon configuration of a configured grant Type 1 for a Serving Cell by upper layers, the MAC entity shall:

store the uplink grant provided by upper layers as a configured uplink grant for the indicated Serving Cell
initialize or re-initialize the configured uplink grant to start in the symbol according to timeDomainOffset and S (e.g., derived from SLIV according to 3GPP TS 38.214 V16.3.0), and to reoccur with periodicity.

According to 3GPP TS 38.331 V16.2.0, a UE is either in the RRC_CONNECTED state or in an RRC inactive state (also referred to as RRC_INACTIVE state) when an RRC connection has been established. If this is not the case (i.e., no RRC connection is established,) the UE is in an RRC idle state (also referred to as RRC_IDLE state). Actions that may be performed by the UE in each RRC state are exemplary described in the following.

In the RRC_IDLE state, the UE may perform the following actions:

UE specific DRX may be configured;
UE controlled mobility may be configured based on network configuration;
monitoring Short Messages transmitted with paging RNTI (P-RNTI) over DCI;
monitoring a Paging channel for CN paging using 5G System Architecture Evolution (SAE) Temporary Mobile Station Identifier (5G-S-TMSI);
performing neighboring cell measurements and cell (re-)selection; and
acquiring system information and sending SI request (if configured).

In the RRC_INACTIVE state, the UE may perform the following actions:

UE specific DRX may be configured;
UE controlled mobility may be configured based on network configuration;
storing the UE Inactive Access Stratum (AS) context;
RAN-based notification area may be configured by RRC layer;
monitoring Short Messages transmitted with P-RNTI over DCI;
monitoring a Paging channel for CN paging using 5G-S-TMSI and RAN paging using full inactive RNTI (I-RNTI);
performing neighboring cell measurements and cell (re-)selection;
performing RAN-based notification area updates periodically and when moving outside the configured RAN-based notification area; and
acquiring system information and sending SI request (if configured).

In the RRC_CONNECTED state, the UE may perform the following actions:

storing the AS context;
transferring unicast data to/from UE;
UE specific DRX may be configured;
for the UEs supporting CA, the UE may use (e.g., be configured with) one or more SCells, aggregated with the SpCell, for increased BW;
for the UEs supporting DC, the UE may use (e.g., be configured with) one SCG, aggregated with the MCG, for increased BW;
network controlled mobility within NR, and between E-UTRA and NR;
monitoring Short Messages transmitted with P-RNTI over DCI, if configured;

monitoring control channels associated with the shared data channel to determine if data is scheduled for it;
providing channel quality and feedback information;
performing neighboring cell measurements and measurement reporting; and
acquiring system information.

FIG. 1 is a schematic diagram illustrating an RRC state machine according to an example implementation of the present application.

Referring to FIG. 1, the RRC state machine 10 illustrates state transitions of a UE in NR. Specifically, a UE in NR may stay in one of the RRC_CONNECTED state 110, the RRC_INACTIVE state 120, and the RRC_IDLE state 130.

In some implementations, a network may initiate an RRC connection release procedure by sending an RRCRelease message to a UE, and the RRC connection release procedure may be initiated for at least one of the following purposes:
  transit the UE from the RRC_CONNECTED state 110 to the RRC_IDLE state 130;
  transit the UE from the RRC_CONNECTED state 110 to the RRC_INACTIVE state 120 (only if SRB2 and at least one DRB is setup in the RRC_CONNECTED state 110);
  keep the UE in the RRC_INACTIVE state 120 when the UE tries to resume; and
  transit the UE from the RRC_INACTIVE state 120 to the RRC_IDLE state 130 when the UE tries to resume.

Specifically, the network may send an RRCRelease message without suspendConfig to transit the UE from the RRC_CONNECTED state 110 or the RRC_INACTIVE state 120 to the RRC_IDLE state 130. On the other hand, the network may send an RRCRelease message with suspendConfig to transit the UE from the RRC_CONNECTED state 110 to the RRC_INACTIVE state 120 or keep the UE in the RRC_INACTIVE state 120.

The suspendConfig IE, for example, may include at least one of the following IEs:
  fullI-RNTI/shortl-RNTI: identifies the suspended UE context of a UE in the RRC_INACTIVE state 120;
  ran-PagingCycle: refers to the UE specific cycle for RAN-initiated paging, where the value rf32 corresponds to 32 radio frames, the value rf64 corresponds to 64 radio frames and so on;
  ran-NotificationAreaInfo: by which the network may ensure that the UE in the RRC_INACTIVE state 120 always has a valid ran-NotificationAreaInfo; and
  t380: refers to the timer that triggers the periodic RAN-based Notification Area Update (RNAU) procedure in the UE, where the value min5 corresponds to 5 minutes, the value min10 corresponds to 10 minutes and so on.

In some implementations, upon reception of an RRCRelease message with suspendConfig from the network, the UE may perform at least one of the following actions:
  applying the received suspendConfig;
  resetting MAC and release the default MAC Cell Group configuration, if any;
  re-establishing RLC entities for SRB1;
  suspending all SRB(s) and DRB(s), except SRB0;
  indicating a PDCP suspend to lower layers of all DRBs;
  indicating the suspension of the RRC connection to upper layers; and
  entering the RRC_INACTIVE state 120 and performing cell (re) selection as specified in 3GPP TS 38.331 V16.2.0.

Small data transmission (SDT) may be a UL data transmission in an RRC_INACTIVE state. The packet size (or data volume) of the transmitted UL data is, for example, lower than a threshold, where the threshold is not limited herein. The UL data of SDT may be transmitted during an SDT procedure. For example, the UL data of SDT may be transmitted via Msg 3 (e.g., based on a 4-step RA), via MsgA (e.g., based on a 2-step RA), and/or via a CG resource (e.g., CG type 1). The UL data of SDT may be transmitted based on a dynamic scheduling and/or a semi-persistent scheduling when the UE is in RRC_INACTIVE.

Figure 2:
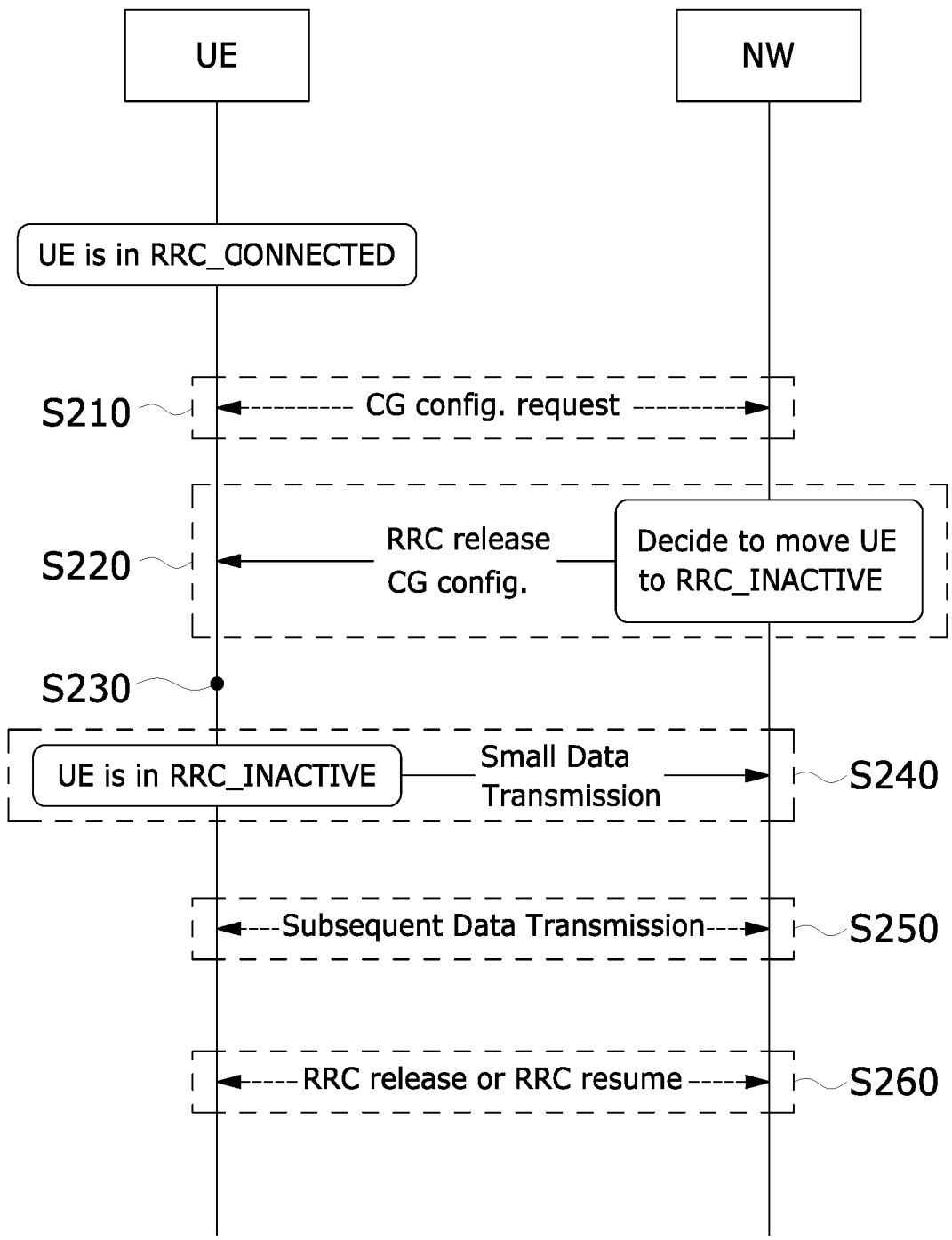
FIG. 2 is a schematic diagram illustrating a procedure for a CG-based SDT according to an example implementation of the present application.

FIG. 2 is a schematic diagram illustrating a procedure for a CG-based SDT according to an example implementation of the present application.

Referring to FIG. 2, communications between a UE and a network are illustrated by a procedure 20. Although steps S210 to S260 in the procedure 20 are exemplary illustrated in sequence, these separately illustrated steps S210 to S260 should not be construed as necessarily order dependent. The order in which the steps S210 to S260 are performed in FIG. 2 is not intended to be construed as a limitation.

In step S210, the UE in the RRC_CONNECTED state may send a CG configuration request to the network. The CG configuration request sent by the UE may, for example, indicate the UE's preference for a configuration with CG Type 1 in the RRC_INACTIVE state. It is noted that step S210 is not indispensable in the procedure 20. In other words, step S210 may not be included in the procedure 20 in some implementations.

In step S220, the network may decide to move the UE to the RRC_INACTIVE state, therefore send an RRC release (e.g., RRCRelease) message with suspendConfig to the UE.

In some implementations, the network may provide a CG configuration to the UE in response to the CG configuration request. In some cases, the RRC release message may include the CG configuration to configure the CG resources to the UE. In some cases, the CG configuration may be provided in an RRC reconfiguration message instead of the RRC release message when the UE is in the RRC_CONNECTED state.

The CG configuration may, for example, include the following information:
  CG periodicity;
  TBS;
  number for the implicit release of the CG resources
  CG Timer;
  retransmission timer;
  number of HARQ process reserved for CG in SDT;
  RSRP threshold for SSB selection and association between SSB and CG resources; and
  Timing Advance (TA) related parameters (e.g., TA timer).

After receiving the RRC release message, the UE in the RRC_CONNECTED state may transit into the RRC_INACTIVE state.

In step S230, the UE in the RRC_INACTIVE state may initiate an SDT procedure based on at least one condition for initiating a CG-based SDT procedure. Specifically, once the at least one condition for initiating a CG-based SDT procedure is met when the UE in the RRC_INACTIVE state, the UE may initiate the SDT procedure. The at least one condition for initiating the CG-based SDT procedure may include at least one of the following:
  UL data arrives at an RB/LCH configured for SDT.
  The UE is configured with a valid PUSCH(s) (at the selected carrier, e.g., NUL or SUL) for performing CG-based SDT procedure.

In some implementations, a PUSCH for performing the CG-based SDT procedure may be considered valid when the PUSCH for the performing CG-based SDT procedure is not suspended/discarded/released/cleared. The UE may suspend/discard/release/clear a PUSCH for performing the CG-based SDT procedure if cg-SDT-TimeAlignmentTimer expires, the DL RSRP change exceeds a configured threshold since the previous TA update, and/or the measured DL RSRP from SSB that corresponds to the CG configuration/resource is below a configured threshold, etc., which is not limited herein.

In some implementations, a PUSCH for performing the CG-based SDT procedure may be considered valid if the RSRP has not increased by more than a configured threshold (e.g., a CG-SDT-RSRP-ChangeThresholdIncrease) when comparing to a stored DL reference RSRP value (since the previous TA update).

In some implementations, a PUSCH for performing the CG-based SDT procedure may be considered valid if the RSRP has not decreased by more than a configured threshold (e.g., a CG-SDT-RSRP-ChangeThresholdDecrease) when comparing to a stored DL reference RSRP value (since the previous TA update).

The total size of available small data for SDT is below a specific data volume threshold for the selection between (CG-based/RA-based) SDT procedure and non-SDT (e.g., normal RRC connection resume procedure/normal RA procedure). The total size of available small data may be the sum of all the available data from the RB(s)/LCH(s) configured for SDT and/or the sum of payload sizes of all the triggered MAC CEs.

In some implementations, the specific data volume threshold may be configured as a sdt-DataVolumeThreshold.

The measured DL RSRP is above a threshold that is used for selecting between a (CG-based/RA-based) SDT procedure or a normal RA procedure.

In some implementations, the threshold that is used for selecting between a (CG-based/RA-based) SDT procedure or a normal RA procedure may be configured by as a sdt-RSRP-Threshold.

It is noted that a UL resource (e.g., PUSCH) for performing the CG-based SDT procedure (e.g., a CG resource or a CG PUSCH) may be referred to as a UL resource of a CG configuration. In this case, the CG configuration may be used for performing the CG-based SDT procedure.

In step S240, the UE in the RRC_INACTIVE state may send an RRC resume request (e.g., RRCResumeRequest) message on a CG resource (e.g., an UL resource) of the CG configuration provided in the RRC release message (e.g., received in step S220) or the RRC reconfiguration message received when the UE is in the RRC_CONNECTED state (e.g., received before step S220).

In some implementations, the UE in the RRC_INACTIVE state may send the RRC resume request message with small data on one UL resource of the CG configuration. In some implementations, the UE in the RRC_INACTIVE state may send the RRC resume request message on an UL resource of the CG configuration and send the small data on another UL resource of the CG configuration.

In step S250, the UE may perform at least one subsequent data transmission. Specifically, the subsequent data transmission may be the transmission of multiple UL and/or DL packets as part of the same SDT mechanism and without transitioning to the RRC_CONNECTED state (e.g., the UE is still in the RRC_INACTIVE state). The subsequent data transmission may be, for example, performed on the CG resources of the CG configuration provided in the RRC release message (e.g., received in step S220) or the RRC reconfiguration message received when the UE is in the RRC_CONNECTED state (e.g., received before step S220).

It is noted that step S250 is not indispensable in the procedure 20. In other words, step S250 may not be included in the procedure 20 in some implementations. For example, the UE may have no data to be transmitted after completed step S240.

In some implementations, the UE may monitor PDCCH via a specific RNTI (e.g., C-RNTI) to receive the dynamic scheduling for UL and/or DL new transmission and/or a retransmission corresponding to a specific transmission. In some implementations, the UE may monitor PDCCH via a UE specific RNTI (e.g., C-RNTI) to receive the dynamic scheduling for the retransmission of CG type 1.

In step S260, the network may send an RRC message for responding the RRC resume request message that the UE sent in step S240.

In some implementations, the network may send an RRC release message with suspendConfig to keep the UE in the RRC_INACTIVE state. In some implementations, the network may send and RRC resume (e.g., RRCResume) message to move the UE to the RRC_CONNECTED state.

In some implementations, the SDT procedure initiated in step S230 is ended when the UE receives the RRC message for responding the RRC resume request message.

Figure 3:
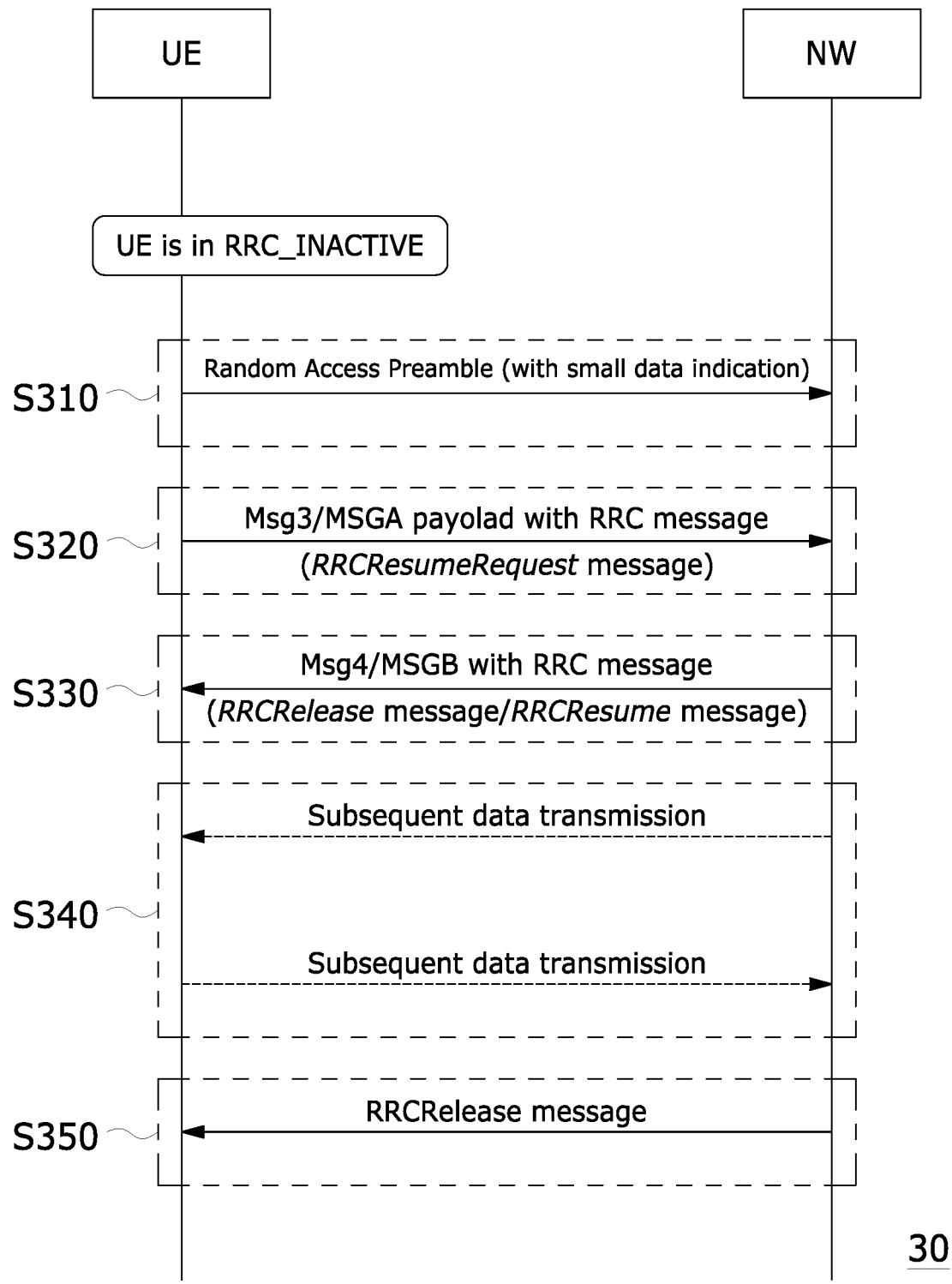
FIG. 3 is a schematic diagram illustrating a procedure for a RA-based SDT according to an example implementation of the present application.

FIG. 3 is a schematic diagram illustrating a procedure for a RA-based SDT according to an example implementation of the present application.

Referring to FIG. 3, communications between a UE and a network are illustrated by a procedure 30. Although steps S310 to S350 in the procedure 30 are exemplary illustrated in sequence, these separately illustrated steps S310 to S350 should not be construed as necessarily order dependent. The order in which the steps S310 to S350 are performed in FIG. 3 is not intended to be construed as a limitation.

In step S310, when a UE in the RRC_INACTIVE state has UL data available for transmission, it may initiate an RA-based SDT procedure for the transmission of the UL data by transmitting an RA preamble to the network. The UE may select either a 4-step RA type or a 2-step RA type. Moreover, the PRACH resource for RA-based SDT procedure (e.g., RA preamble with small data indication) and normal RA procedure (e.g., RA preamble without small data indication) may be different. In step S310, the UE may select the PRACH resource for RA-based SDT procedure therefore the RA preamble with small data indication is transmitted.

In step S320, the UE may transmit an RRC message through MSG3 (when 4-step RA type is selected) or MSGA (when 2-step RA type is selected). The RRC message may be, for example, an RRC resume request message. In addition to the RRC message, MAC CE (e.g., BSR) and DRB data packet (e.g., small data) may be included in MSG3/MSGA as well.

Then, the UE may monitor RA-RNTI/MSGB-RNTI for MSG4/MSGB, in which the contention resolution ID will be carried.

In step S330, the network may transmit RRC message in MSGA/MSGB. The RRC message may be an RRC release message (with suspendConfig IE) or an RRC resume message. The UE may stay in the RRC_INACTIVE state if it receives an RRC release message (with suspendConfig IE) or enters the RRC_CONNECTED state if it receives an RRC resume message. In addition, MAC CE (e.g., BSR) and DRB data packet (e.g., small data) can be included in MSG4/MSGB as well.

Once the RA procedure is successfully completed, in step S340, the UE may monitor a specific RNTI (e.g., C-RNTI) for subsequent data transmission. In step S340, the subsequent data transmission may be the transmission of multiple UL and/or DL packets as part of the same SDT mechanism and without transitioning to the RRC_CONNECTED state (e.g., the UE is still in the RRC_INACTIVE state). In some implementations, the UE may monitor PDCCH via a specific RNTI (e.g., C-RNTI) to receive the dynamic scheduling for UL and/or DL new transmission and/or the corresponding retransmission. In some implementations, the UE may monitor PDCCH via a UE specific RNTI (e.g., C-RNTI) to receive the dynamic scheduling for the retransmission of CG type 1.

In step S350, the network may transmit an RRC release message to the UE. Once the RRC release message (with suspendConfig IE) is received, the UE may stop monitoring the C-RNTI and enter the RRC_INACTIVE state.

In order to perform SDT in the RRC_INACTIVE state, the UE may need to have a beam alignment with the network to enable data transmission. For the RA-based SDT as illustrated in FIG. 3, the beam alignment with the network is acquired through an RA procedure. For the CG-based SDT procedure as illustrated in FIG. 2, how to acquire the beam alignment with the network needs to be considered due to skipping of the RA procedure. In some implementations, similar concept as the RA procedure may be used for the CG-based SDT procedure. For example, association between CG resources and (DL) SSBs may be relied upon to acquire the initial beam alignment. Since the UE may only perform (DL) SSB-based measurement in the RRC_INACTIVE state, the (DL) SSB measurement results may be used to select the proper beam for CG transmission. It is noted that the (DL) SSB may be referred to as DL beam and the DL beam may be referred to as (DL) SSB in this disclosure.

Figure 4:
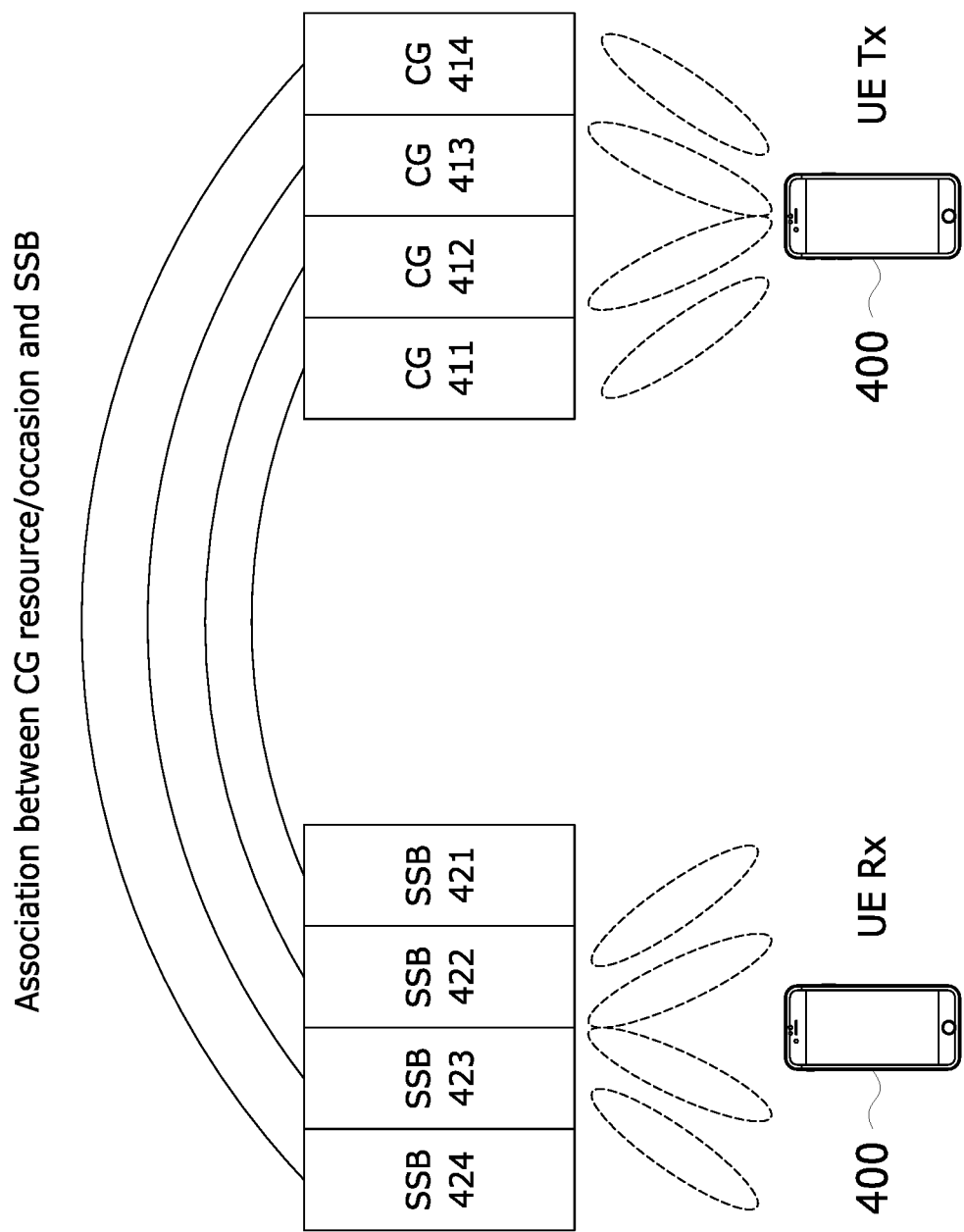
FIG. 4 is a schematic diagram illustrating a beam alignment according to an example implementation of the present application.

FIG. 4 is a schematic diagram illustrating a beam alignment according to an example implementation of the present application.

Referring to FIG. 4, CG resources 411, 412, 413, 414, and an association between the CG resources 411, 412, 413, 414 and SSBs 421, 422, 423, 424 may be provided by the network to the UE 400, and the UE 400 may store the CG resources and the association as UE Inactive AS content when the UE 400 is sent to the RRC_INACTIVE state. According to the association as illustrated in FIG. 4, the CG resource 411 is associated with the SSB 421, the CG resource 412 is associated with the SSB 422, the CG resource 413 is associated with the SSB 423, and the CG resource 414 is associated with the SSB 424.

When the network receives UL data on a specific CG resource, the network may know which DL beam (e.g., DL SSB/TRS/CSI-RS/assistance RS) may be used to send the DL response based on the association between the (DL) SSBs and the CG resources. When the UE receives the DL response, which may be an L1 ACK, the UE may consider that it acquires the beam alignment with the network.

Taking the association between the CG resource 411 and the SSB 421 in FIG. 4 as an example, when the network receives UL data on, for example, the CG resource 411, from the UE 400, the network may know that the DL response may be sent on the (DL) SSB 421 based on the association. When the UE 400 receives the L1 ACK as the DL response, the UE 400 may consider that it acquires the beam alignment with the network. The same applies to the other CG resources 412, 413, and 414, which are not repeated herein.

A potential procedure of beam operation for CG-based SDT is described as an example below.

As mentioned above, the CG resources (e.g., 411, 412, 413, 414) and the association with (DL) SSBs (e.g., 421, 422, 423, 424) may be provided by the network and stored as UE Inactive AS content when a UE (e.g., 400) is sent to the RRC_INACTIVE state.

The UE (e.g., 400) may perform (DL) SSB-based measurement in the RRC_INACTIVE state and select an (DL) SSB (e.g., 423) with RSRP above a threshold (e.g., threshold_DL_measurement) amongst the associated (DL) SSBs (e.g., 421, 422, 423, 424) when initiating a CG-based SDT procedure and/or before transmitting small data via a CG resource. The UE (e.g., 400) may transmit the UL data via a CG resource (e.g., 413) which is associated with the selected (DL) SSB (e.g., 423).

Once the network received the UL data, the network may know which DL beam (e.g., (DL) SSB/TRS/CSI-RS/assistance RS/TCI-state) is qualified for the UE (e.g., 400). Additionally, and alternatively, the UE (e.g., 400) may explicitly indicate the beam information (e.g., the selected/candidate/qualified (DL) SSB index(es)) to the network via the CG resource (e.g., 413). The beam information may be, for example, indicated via RRC signaling, MAC signaling (e.g., MAC CE) and/or PHY signaling. In this case, the UE (e.g., 400) may receive a DL response from the network based on the selected (DL) SSB (e.g., 423).

Transmission of UL data (e.g., small data) while a UE is in the RRC_INACTIVE state may not happen frequently. Hence, a mechanism to allow UE in the RRC_INACTIVE state to release/discard/suspend the CG resource(s) that corresponds to CG configuration(s) may be beneficial. This increases the efficiency of the CG resource(s) because the network may configure/schedule the CG resource(s) released/discarded/suspended by a UE, to another UE when needed.

Some conditions are introduced allowing a UE in the RRC_INACTIVE state to conditionally release/discard/suspend a CG resource(s)/configuration(s) are introduced in the following. For example, a UE in the RRC_INACTIVE state may release/discard/suspend a CG resource(s)/configuration(s) if it skips a specific number of (consecutive) UL transmission (e.g., transmission in step S240 and S250 shown in FIG. 2) and/or a specific number of (consecutive) UL transmission (e.g., transmission in step S240 and S250 shown in FIG. 2) failures occur. Moreover, some UE behaviors which may be performed after releasing/discarding/suspending the CG resource(s)/configuration(s) are also introduced in the following.

In some implementations, a counter (e.g., UL_skipping_COUNTER) may be used to count the number of UL transmissions that has been skipped by a UE in the RRC_INACTIVE state and/or the number of UL transmissions that is not successfully transmitted by the UE in the RRC_INACTIVE. On the other hand, a threshold (e.g., max-UL-skipping) may be (pre) configured to the UE. In this sense, the counter (e.g., UL_skipping_COUNTER) reaching the threshold (e.g., max-UL-skipping) may indicate the specific number of (consecutive) UL transmissions have been skipped and/or the specific number of (consecutive) UL transmission failures have been occurred. In response thereto, the UE may perform at least one of a plurality of actions (e.g., Action 1 to Action 9 introduced in the following).

In some implementations, two counters may be configured at a UE. A first counter (e.g., UL_skipping_ COUNTER) may be used to count the number of UL transmissions skipped by the UE in the RRC_INACTIVE state. In addition, a second counter (e.g., UL_fail_ COUNTER) may be used to count the number of UL transmissions that is not successfully transmitted by the UE in the RRC_INACTIVE.

On the other hand, a first threshold (e.g., max-UL-skipping) and a second threshold (e.g., max-UL-fail) may be (pre) configured to the UE. The first counter (e.g., UL_skipping_COUNTER) reaching the first threshold (e.g., max-UL-skipping) may indicate that the specific number of (consecutive) UL transmission have been skipped. Moreover, the second counter (e.g., UL_fail_COUNTER) reaching the second threshold (e.g., max-UL-fail) may indicate that the specific number of (consecutive) UL transmission failures have been occurred. Whenever the UE considers that the specific number of (consecutive) UL transmission have been skipped and/or the specific number of (consecutive) UL transmission failures have been occurred, it may perform at least one of a plurality of actions (e.g., Action 1 to Action 9 introduced in the following).

In some implementations, the (first) counter (e.g., UL_skipping_COUNTER) may be maintained as a variable by the UE per (subset of) CG configuration, per group of multiple CG configurations, per BWP, per carrier, per UE, etc., which is not limited herein.

In some implementations, the (first) threshold (e.g., max-UL-skipping) may be configured per DL-SSB, per CG configuration, per BWP, per carrier, per UE, etc., which is not limited herein.

In some implementations, the (first) threshold (e.g., max-UL-skipping) may be configured by the network via broadcast system information (e.g., SIB) and/or dedicated RRC signaling (e.g., RRC release message with suspendconfig and/or RRC reconfiguration message), which is not limited herein.

In some implementations, the (first) threshold (e.g., max-UL-skipping) may be preconfigured in the UE.

In some implementations, the (first) threshold (e.g., max-UL-skipping) may be configured in an RRC release message. For example, the (first) threshold (e.g., max-UL-skipping) may be configured in the suspendConfig IE in the RRC release message. As such, the UE may start applying the (first) threshold (e.g., max-UL-skipping) upon transitioning from the RRC_CONNECTED state to the RRC_INACTIVE state and/or upon receiving the RRC release message with suspendConfig.

In some implementations, the (first) threshold (e.g., max-UL-skipping) may be configured in an RRC reconfiguration message. The UE may receive the (first) threshold (e.g., max-UL-skipping) in the RRC reconfiguration message when the UE is in the RRC_CONNECTED state. The UE may store the configuration when the UE is in the RRC_CONNECTED state. In some implementations, the UE may apply the stored configuration once the UE switches to the RRC_INACTIVE state. In some implementations, the UE may apply the stored configuration once the UE receives an RRC release message with a suspend configuration (i.e., with suspendConfig).

In some implementations, the (first) threshold (e.g., max-UL-skipping) may be configured in a specific configuration. The specific configuration are exemplary described by several implementations in the following.

In some implementations, the specific configuration may be included in broadcast system information (e.g., SIB) and/or dedicated RRC signaling (e.g., RRC release message with suspendConfig and/or RRC reconfiguration message).

In some implementations, the specific configuration may be preconfigured in the UE.

In some implementations, the specific configuration may be configured in an RRC release message. For example, the specific configuration may be configured in the suspendConfig IE in the RRC release message. As such, the UE may start applying the (first) threshold (e.g., max-UL-skipping) upon transitioning from the RRC_CONNECTED state to the RRC_INACTIVE state and/or upon receiving the RRC release message with suspendConfig.

In some implementations, the specific configuration may be a CG configuration that allocates/schedules CG resource (e.g., ConfiguredGrantConfig IE). In this case, the (first) threshold (e.g., max-UL-skipping) may be used as the threshold for the corresponding CG configuration.

In some implementations, the specific configuration may be a configuration that configures a (UL) BWP (e.g., BWP-UplinkDedicated). Moreover, one or multiple CG configurations may be configured in the (UL) BWP. In this case, the (first) threshold (e.g., max-UL-skipping) may be used as the threshold for the one or multiple CG configurations in the corresponding (UL) BWP.

In some implementations, the specific configuration may be a DL resource configuration that configures one or multiple DL-SSBs (e.g., RadioLinkMonitoringRS IE). Moreover, the one or multiple DL-SSBs may correspond to one or multiple CG configurations. In this case, the (first) threshold (e.g., max-UL-skipping) may be used as the threshold for the one or multiple CG configurations.

In some implementations, the specific configuration may be a DL resource configuration that configures one or multiple DL-SSBs (e.g., RadioLinkMonitoringRS IE). Moreover, the one or multiple DL-SSBs may correspond to a subset of CG resources in a CG configuration. In this case, the (first) threshold (e.g., max-UL-skipping) may be used as the threshold for the subset of CG resources.

In some implementations, the specific configuration may be a configuration that configures a NUL/SUL carrier (e.g., supplementaryUplink/uplinkConfig IE). Moreover, one or multiple CG configurations may be configured in the NUL/SUL carrier. In this case, the (first) threshold (e.g., max-UL-skipping) may be used as the threshold for the NUL/SUL carrier.

In some implementations, the specific configuration may be configured in an RRC reconfiguration message. The UE may receive the specific configuration in the RRC reconfiguration message when the UE is in the RRC_CONNECTED state. The UE may store the specific configuration when the UE is in the RRC_CONNECTED state. In some implementations, the UE may apply the stored configuration once the UE switches to the RRC_INACTIVE state. In some implementations, the UE may apply the stored specific configuration once the UE receives an RRC release message with a suspend configuration (i.e., with suspendconfig).

In some implementations, the (first) counter (e.g., UL_skipping_COUNTER) may be initially set to 0 when the UE receives the RRC release message with suspendConfig IE that moves the UE to the RRC_INACTIVE state.

In some implementations, the (first) counter (e.g., UL_skipping_COUNTER) may be initially set to 0 when the UE receives the specific configuration as mentioned above.

In some implementations, the (first) counter (e.g., UL_skipping_COUNTER) may be initially set to 0 when the CG-based SDT procedure is initiated and/or stopped.

In some implementations, the (first) counter (e.g., UL_skipping_COUNTER) may be initially set to 0 when a BWP that the (first) counter (e.g., UL_skipping_COUNTER) corresponds to is activated.

In some implementations, the (first) counter (e.g., UL_skipping_COUNTER) may be initially set to 0 when the UE switches to an UL carrier (e.g., NUL/SUL) that the (first) counter (e.g., UL_skipping_COUNTER) corresponds to.

In some implementations, a UE may skip (UL) transmission for an UL grant (e.g., the MAC entity may not generate a MAC PDU for the HARQ entity) and/or increment the (first) counter (e.g., UL_skipping_COUNTER) if the UL grant is a configured UL grant and/or a dynamic grant. In other words, the UE may not skip (UL) transmission for an UL grant (e.g., the MAC entity may not generate a MAC PDU for the HARQ entity) and/or not increment the (first) counter (e.g., UL_skipping_COUNTER) if the UL grant is a RAR grant, and/or a MsgA PUSCH.

The dynamic grant, the RAR grant and the MsgA PUSCH are briefly described below.

Regarding the dynamic grant, which may be a resource dynamically allocate by the gNB to UEs via the Cell Radio Network Temporary Identifier (C-RNTI) on PDCCH(s).

Regarding the RAR grant, which may be a UL grant provided via Msg2/RAR and/or MsgB of the 4-step/2-step RA procedure. The UL grant may be included in a MAC payload for RAR and/or MsgB (e.g., MAC RAR and/or fallback RAR). The UL grant may be provided by an uplink grant field which indicates the resources to be used on the uplink. The size of the UL grant field may be 27 bits. The transmission for the RAR grant may be via Msg 3.

Regarding the MsgA PUSCH, the PUSCH transmissions are organized into PUSCH Occasions (POs) which span multiple symbols and PRBs with optional guard periods and guard bands between consecutive POs. Each PO consists of multiple DMRS ports and DMRS sequences.

The UE may increment the (first) counter (e.g., UL_skipping_COUNTER) based on at least one conditions. For example, the UE may increment the (first) counter (e.g., UL_skipping_COUNTER) by a value (e.g., "1") based on at least one conditions. The at least one condition is exemplary described by several implementations below.

In some implementations, the (first) counter (e.g., UL_skipping_COUNTER) may be incremented if a UE skips transmission on a UL resource and/or unsuccessfully transmits on a UL resource.

In some implementations, the (first) counter (e.g., UL_skipping_COUNTER) may not be incremented if the UE performs (UL) transmission on a specific UL resource and/or successfully transmits on a specific UL resource. The specific UL resource may be, for example, a UL resource scheduled by RAR.

In some implementations, the (first) counter (e.g., UL_skipping_COUNTER) maintained in a (subset of) CG configuration may be incremented if the UE skips transmission on a CG resource and/or unsuccessfully transmit on a CG resource that corresponds to the (subset of) CG configuration.

In some implementations, the (first) counter (e.g., UL_skipping_COUNTER) maintained in a group of multiple CG configurations may be incremented if the UE skips transmission on a CG resource and/or unsuccessfully transmit on a CG resource that corresponds to the group.

In some implementations, the (first) counter (e.g., UL_skipping_COUNTER) maintained in a BWP/carrier may be incremented if the UE skips transmission on a UL resource and/or unsuccessfully transmit on a UL resource that is configured/scheduled in the BWP/carrier. Here, the carrier may be referred to a NUL/SUL carrier. The UL resource may be, for example, referred to a PUSCH resource scheduled by a dynamic grant and/or a CG resource.

The UE may skip a transmission on a UL resource based on at least one conditions. The at least one condition is exemplary described by several implementations below.

In some implementations, a UE may skip transmission on a UL resource if a BWP, which the UL resource is configured/scheduled, is deactivated. For example, the BWP may be deactivated if the UE switches to a new BWP. The new BWP may be activated after the UE switches to the new BWP.

In some implementations, a CG SDT time alignment timer (i.e., cg-SDT-TimeAlignmentTimer), which may be used to define a period during which a time alignment value may be considered valid, is introduced. In addition, the configuration, the (re) start condition, and the stop condition thereof are exemplary described as below.

Regarding the configuration, the cg-SDT-TimeAlignmentTimer may be configured in the suspendConfig IE in the RRC release message.

Regarding the configuration, the cg-SDT-TimeAlignmentTimer may be configured in an IE that configures the CG configuration for uplink transmission in suspendConfig 1E in the RRC release message.

Regarding the configuration, the cg-SDT-TimeAlignmentTimer may be equivalent to the timeAlignmentTimer in the RRC_CONNECTED state. In this case, the network may not configure the cg-SDT-TimeAlignmentTimer to a UE via the RRC release message.

Regarding the (re) start condition, the cg-SDT-TimeAlignmentTimer may be (re) started upon a UE receives the configuration of the cg-SDT-TimeAlignmentTimer from the network. For example, the UE may (re) start cg-SDT-TimeAlignmentTimer if it receives an RRC release message with cg-SDT-TimeAlignmentTimer IE.

Regarding the (re) start condition, the cg-SDT-TimeAlignmentTimer may be (re) started when a UE enters the RRC_INACTIVE state.

Regarding the (re) start condition, the cg-SDT-TimeAlignmentTimer may be (re) started when a UE receives a timing advance information from the network. For example, a timing advance command MAC CE may be considered as the timing advance information. For another example, a PDCCH (e.g., DCI) that indicates timing advance adjustment may be considered as the timing advance information.

Regarding the stop condition, the cg-SDT-TimeAlignmentTimer configured at a UE may be stopped when the cg-SDT-TimeAlignmentTimer is discarded/released by the UE. For example, the MAC entity of the UE may stop the cg-SDT-TimeAlignmentTimer after being informed by the RRC layer of the UE that the cg-SDT-TimeAlignmentTimer is discarded/released.

In some implementations, a UE may skip transmission on a UL resource if the cg-SDT-TimeAlignmentTimer has expired while the UL resource becomes available. In other words, a UE may skip transmission on a UL resource if the cg-SDT-TimeAlignmentTimer expires before the occurrence of the UL resource. In some cases, the UE may be prohibited to perform UL transmission on the UL resource if the cg-SDT-TimeAlignmentTimer has expired. The UL resource may be, for example, referred to a PUSCH resource scheduled by a dynamic grant and/or a CG resource.

In some implementations, a UE may skip transmission on a CG resource if the UE has received a specific indication. In other words, if the CG resource occurs after the UE receives the specific indication, the UE may skip transmission on the CG resource.

In some implementations, the UE in the RRC_INACTIVE state may, after receiving the specific indication from the network, release/discard/suspend all the CG configurations.

In some implementations, the specific indication may be included in a broadcast system information (e.g., SIB). The specific indication may indicate that SDT using CG resource in the RRC_INACTIVE state is no longer supported in the cell (e.g., when connected to 5GC).

In some implementations, the specific indication may be included in a dedicated signaling to keep the UE in the RRC_INACTIVE state (e.g., an RRC release message with suspendConfig IE) in response to an UL transmission including small data from the UE (e.g., the UE transmission may include both small data and an RRC resume request message). Moreover, the specific indication may not include a cg-SDT-TimeAlignmentTimer IE.

In some implementations, a UE may skip transmission on a UL resource if it does not have UL data and/or MAC CE available for transmission on the UL resource.

In some implementations, a DRB/SRB may be mapped to a logical channel (LCH) if the LCH identity (e.g., LogicalChannelIdentity) of the LCH and the DRB/SRB identity of the DRB/SRB (e.g., DRB-Identity/SRB-Identity) are configured, by the network, in the same RLC-BearerConfig. While the UE is in the RRC_INACTIVE state, the UL data may come from an LCH that is mapped to a DRB/SRB that is not unsuspended/released and/or a DRB/SRB that is configured for small data transmission. In this case, the UL data came from the LCH may be considered available for transmission on the UL resource. Otherwise, the UE is considered to not have UL data for transmission on the UL resource. Moreover, the data came from this LCH may be small data.

In some implementations, the UL data may come from a specific LCH. For example, only the UL data came from the specific LCH may be considered available for transmission on the UL resource.

In some implementations, the DRB/SRB mapped to the specific LCH may not be suspended/released when the UE transits from the RRC_CONNECTED state to the RRC_INACTIVE state after the RRC connection release procedure.

In some implementations, the specific LCH may be configured by the network via dedicated RRC signaling. Moreover, the specific LCH may be used for SDT while the UE is in the RRC_INACTIVE state. Moreover, the data from the specific LCH may be small data.

In some implementations, the specific LCH may be configured in suspendConfig IE in the RRC release message.

In some implementations, the specific LCH may be configured in an IE that configures the CG configuration for uplink transmission in suspendConfig IE in the RRC release message.

In some implementations, only the UL data came from the LCH and/or MAC CE may be considered available for transmission on a UL resource if the data from the LCH and/or MAC CE can be mapped to the UL resource for transmission. The UL resource may be, for example, referred to a PUSCH resource scheduled by a dynamic grant and/or a CG resource.

To map a LCH and/or MAC CE to a specific UL resource, one or more LCP mapping restrictions may be configured for each LCH and/or MAC CE, e.g., maxPUSCH-Duration, configuredGrantType1Allowed, allowedCG-List, etc. The data from a LCH and/or a MAC CE may be mapped to a UL resource for transmission if the UL resource satisfies the requirements specified by the LCP mapping restriction(s) configured to the LCH and/or MAC CE. The LCP mapping restriction(s) may be configured in LogicalChannelConfig for an LCH.

In some implementations, the UL data from the LCH and/or MAC CE may be considered available for transmission on the CG resource only if the total size of the pending UL data and/or MAC CE is smaller than (or equal to) a specific size threshold (e.g., Threshold_CG).

In some implementations, the specific size threshold (e.g., Threshold_CG) may be the TBS of the CG resource.

In some implementations, the specific size threshold (e.g., Threshold_CG) may be configured by the network via broadcast system information (e.g., SIB) or dedicated RRC signaling.

In some implementations, the specific size threshold (e.g., Threshold_CG) may be configured in the RRC release message, e.g., in the suspendConfig in the RRC release message.

In some implementations, the specific size threshold (e.g., Threshold_CG) may be configured in an IE that configures the CG configuration for uplink transmission in the RRC release message, e.g., in the suspendConfig in the RRC release message.

In some implementations, while calculating the total size, the UE may only take the pending UL data and/or MAC CE that can be mapped to the CG resource into consideration. The size of the MAC subheader may not be taken into consideration when calculating the total size.

In some implementations, the MAC CE may be triggered while the UE is in the RRC_INACTIVE state. Subsequently, when the UE has a UL resource available for transmission, the UE may generate the MAC CE for transmission on the UL resource and cancel the triggered MAC CE.

In some implementations, the MAC CE may be considered available for transmission on the UL resource if it has been triggered and is not canceled when the UL resource becomes available for transmission.

In some implementations, the MAC CE may be for reporting the amount of UL data available/pending at the UE side (e.g., a BSR MAC CE) and/or whether there is incoming DL/UL data predicted by the UE.

For example, a BSR may be triggered when a UE has UL data (e.g., came from a specific LCH) available for transmission when the US is in the RRC_INACTIVE state. Subsequently, when a UL resource becomes available and the BSR has been triggered, the UE in the RRC_INACTIVE state may generate a BSR MAC CE for transmission on the UL resource and cancel the triggered BSR when the BSR MAC CE has been transmitted. In this example, the BSR MAC CE may be considered available for transmission on the UL resource when it is triggered and is not canceled.

In some implementations, the UE may skip UL transmission on a UL resource (e.g., not to generate a MAC PDU/TB for transmission on the UL resource) if at least one of the rules (e.g., Rule 1 to Rule 4 described in the following) is satisfied. The UL resource may be, for example, referred to a PUSCH resource scheduled by a dynamic grant and/or a CG resource.

Rule 1: When the UE is configured with a parameter for UL skipping, e.g., skipCGresource with value TRUE.

In some implementations, the UE may receive the parameter for UL skipping together with a CG configuration (that the CG resource corresponds to).

In some implementations, if skipCGresource is configured with a value TRUE, the UE may skip UL transmissions for a CG resource if no data is available for transmission (and at least one of the other defined rules is satisfied). On the other hand, if skipCGresource is not configured or is configured with a value FALSE, the UE may not skip UL transmissions for a CG resource even if no data is available for transmission. In this case, the UE may transmit padding bits and/or padding BSR on the CG resource.

Rule 2: When there is no aperiodic CSI requested for this PUSCH transmission.

Rule 3: When the MAC PDU/TB includes zero MAC SDUs.

Rule 4: When the MAC PDU/TB includes only the periodic BSR and there is no data available for any LCG, or when the MAC PDU includes only the padding BSR.

In some implementations, if skipCGresource is configured with a value TRUE for a CG configuration, the UE may not increment the (first) counter (e.g., UL_skipping_COUNTER) configured for the CG configuration.

In some implementations, the UE may reset the (first) counter (e.g., UL_skipping_COUNTER) if it has been configured, by the network, skipCGresource with a value TRUE.

In some implementations, the UE may skip transmission on a CG resource if the DL-SSB corresponding to the CG resource is not qualified.

In some implementations, a UE may be configured with one or more DL-SSBs, and each of the one or more DL-SSBs may occur periodically.

Specifically, each of the one or more DL-SSBs may correspond to a CG resource, and the mapping or the association between the CG resource and the DL-SSB may be configured by the network via dedicated RRC signaling (e.g., configured in RRC release message with suspendConfig IE). The one or more DL-SSBs may be, for example, configured in the same DL-SSB configuration.

In some implementations, the UE in the RRC_INACTIVE state may perform measurement (e.g., RSRP measurement) amongst the configured DL-SSBs and select an DL-SSB with RSRP equal to/above a configured threshold (e.g., threshold_DL_measurement) when initiating the CG-based SDT procedure and/or before transmitting small data via CG resource.

In some implementations, the UE may transmit the UL data via a CG resource which is associated with the selected DL-SSB. As such, the network may know which DL beam (e.g., SSB/TRS/CSI-RS/assistance RS/TCI-state) is qualified for the UE.

In some implementations, the UE may skip transmission on a CG resource where no DL-SSB corresponding to the CG resource is selected. That is to say, the UE may skip transmission on a CG resource if the DL-SSB corresponding to the CG resource is below the configured threshold (e.g., threshold_DL_measurement). Hence, the (first) counter (e.g., UL_skipping_COUNTER) maintained in the CG configuration that the CG resource corresponds to may be incremented (e.g., by 1).

In some implementations, the UE in the RRC_INACTIVE state may perform measurement (e.g., RSRP measurement) amongst the one or more configured DL-SSBs on a periodic basis, for example. Moreover, the (first) counter (e.g., UL_skipping_COUNTER) may be incremented (e.g., by 1) if none of the one or more configured DL-SSBs is selected within the period.

In some implementations, the UE in the RRC_INACTIVE state may perform measurement (e.g., RSRP measurement) amongst the one or more configured DL-SSBs in a DL-SSB configuration on a periodic basis, for example. Moreover, the (first) counter (e.g., UL_skipping_ COUNTER) maintained in the DL-SSB configuration may be incremented (e.g., by 1) if none of the one or more configured DL-SSBs in the DL-SSB configuration is selected within the period.

In some implementations, the UE may skip transmission on a UL resource if the UL resource partially or fully overlaps with another UL resource in the time domain. The UL resource may be, for example, referred to a PUSCH resource scheduled by a dynamic grant and/or a CG resource.

In some implementations, the UE may skip transmission on a CG resource if the CG resource partially or fully overlaps with another UL resource (e.g., PUSCH, PRACH, PUCCH, etc.) in the time domain, and the CG resource is deprioritized as a result of an intra-UE prioritization procedure.

Specifically, when two or more UL resources partially or fully overlap in the time domain in the same serving cell, the UE may perform an intra-UE prioritization procedure. During the intra-UE prioritization procedure, the UE may select one out of the two or more UL resources that partially or fully overlap in the time domain in the same serving cell. Consequently, the selected UL resource may be transmitted by the UE. For example, the UE may adjust the priority of the two or more UL resources and select the UL resource based on the priority.

In a case that a CG resource overlaps with a DG resource (e.g., a PUSCH scheduled by a dynamic grant DCI) in the time domain, the UE may prioritize the DG resource and deprioritize the CG resource. A DG resource may be used for new transmission or retransmission. The network may schedule a DG resource for retransmission of a TB that was initially transmitted on a CG resource.

In a case that a CG resource overlaps with a PUSCH resource scheduled by a RAR in the time domain, the UE may prioritize the PUSCH resource scheduled by a RAR and deprioritize the CG resource.

In a case that a CG resource overlaps with a PRACH resource (e.g., a resource for transmitting a RA preamble), the UE may prioritize the PRACH resource and deprioritize the CG resource.

In some implementations, the UE may skip transmission on a CG resource if the corresponding CG configuration is suspended.

In some implementations, the UE may skip transmission on a CG resource if it is on a carrier different from where the CG resource is configured/scheduled. For example, the UE may skip a CG resource configured/scheduled on a NUL carrier if the UE is currently on an SUL carrier. Moreover, switching between the NUL carrier and the SUL carrier means that the UL transmissions move from one carrier to the other carrier, which may be done by either an indication in DCI or by an RA procedure.

In some implementations, transmission on a UL resource may be considered unsuccessful if the UE does not receive, from the network, a specific response after transmitting the UL resource.

In some implementations, the UE may (re) start a first timer (e.g., cg-SDT timer) or a specific window (e.g., cg-SDT window) upon transmitting the UL resource. While the first timer (e.g., cg-SDT timer) is running, the UE may monitor on a specific search space/CORESET/PDCCH for possible transmission(s) of specific response(s). Subsequently, if the UE does not receive a specific response in the duration of the first timer (e.g., cg-SDT timer), the UE may consider transmission on the UL resource to be unsuccessful. The UL resource may be, for example, referred to a PUSCH resource scheduled by a dynamic grant and/or a CG resource. In some cases, a specific search space/CORESET/PDCCH and a first timer (e.g., cg-SDT timer) may be configured in an IE that configures a CG configuration for performing SDT during a CG-based SDT procedure. Moreover, the UE may monitor on the specific search space/CORESET/PDCCH upon transmitting on a CG PUSCH (that corresponds to the CG configuration) and/or while the first timer corresponding to the CG configuration is running.

In some implementations, transmission on a UL resource may be considered unsuccessful if the UE receives, from the network, a specific response that indicates NACK after transmitting the UL resource. Specifically, the UE may (re) start a first timer (e.g., cg-SDT timer) upon transmitting the UL resource. While the first timer (e.g., cg-SDT timer) is running, the UE may monitor on a specific search space/CORESET/PDCCH for possible transmission(s) of the specific response(s). The UL resource may be, for example, referred to a PUSCH resource scheduled by a dynamic grant and/or a CG resource.

In some implementations, transmission on a UL resource may be considered unsuccessful if the UE receives, from the network, a specific response that indicates a fallback after transmitting the UL resource. Specifically, the UE may (re) start a first timer (e.g., cg-SDT timer) upon transmitting the UL resource. While the first timer (e.g., cg-SDT timer) is running, the UE may monitor on a specific search space/CORESET/PDCCH for possible transmission(s) of the specific response(s). The UL resource may be, for example, referred to a PUSCH resource scheduled by a dynamic grant and/or a CG resource.

In some implementations, the UE may initiate a RA-based SDT procedure upon reception of a specific response that indicates a fallback.

In some implementations, the UE may release/discard/suspend a CG configuration upon reception of a specific response that indicates a fallback.

In some implementations, the UE may stop an RRC resume procedure, which is initiated as part of a CG-based SDT procedure, upon reception of a specific response that indicates a fallback. Upon initiation of the RRC resume procedure, the UE may transmit an RRC resume request message to the network. Moreover, the UE may be expected to receive an RRC message (e.g., RRC release message or RRC resume message) from the network in response of the RRC resume request message.

In some implementations, transmission on a UL resource may be considered successful if the UE receives, from the network, a specific response that indicates ACK after transmitting the UL resource. Specifically, the UE may (re) start a first timer (e.g., cg-SDT timer) after transmitting the UL resource. While the first timer (e.g., cg-SDT timer) is running, the UE may monitor on a specific search space/CORESET/PDCCH for possible transmission(s) of the specific response(s). The UL resource may be, for example, referred to a PUSCH resource scheduled by a dynamic grant and/or a CG resource.

In some implementations, transmission on a UL resource may be considered unsuccessful if the first timer (e.g., cg-SDT timer) expires/stops. The UL resource may be, for example, referred to a PUSCH resource scheduled by a dynamic grant and/or a CG resource.

In some cases, the network may configure a first timer (e.g., cg-SDT timer) for a UE in a CG configuration in an RRC Release message. The CG configuration may be used for performing a CG-based SDT procedure while the UE is in the RRC_INACTIVE state. Subsequently, the first timer (e.g., cg-SDT timer) may be started when the UE performs a UL transmission on a PUSCH that corresponds to the CG configuration. When the first timer (e.g., cg-SDT timer) expires or stops, the UE may consider transmission on the UL resource unsuccessful. In some cases, when the first timer (e.g., cg-SDT timer) expires, the UE may consider the corresponding CG-based SDT procedure to be unsuccessful.

The specific response may be DCI-based, MAC CE-based, and/or RRC message-based, which is not limited in the disclosure. The specific response is exemplary described by several implementations below.

In some implementations, the specific response may be DCI-based (e.g., a DCI). Moreover, the DCI-based specific response may be transmitted on a specific search space/CORESET/PDCCH. Moreover, the DCI-based specific response may be associated with a C-RNTI and/or a CS-RNTI. In some instances, the DCI-based specific response associated with a C-RNTI may be a dynamic grant that indicates a PUSCH for UL transmission or a dynamic downlink assignment that indicates a PDSCH for DL reception. In some instances, the DCI-based specific response associated with a CS-RNTI may be a dynamic grant that indicates a PUSCH for UL retransmission, where the PUSCH for UL retransmission may be used for retransmitting a MAC PDU that was transmitted on a PUSCH for performing a CG-based SDT procedure (e.g., a CG PUSCH) with the same HARQ process ID.

In some implementations, a HARQ ID field may be included in the DCI to identify the HARQ process ID of the UL resource that the specific response corresponds to. For example, if a HARQ ID value of 1 is included in the HARQ ID field, the UE may determine that the specific response is responding to the transmitted UL resource with an HARQ ID of 1. The UL resource may be, for example, referred to a PUSCH resource scheduled by a dynamic grant and/or a CG resource.

In some implementations, a CG ID field may be included in the DCI to identify the ID of the CG configuration (e.g., configuredGrantConfigIndex or configuredGrantConfigIndexMAC) that the specific response corresponds to. For example, if a CG configuration ID value of 1 is included in the CG configuration ID field, the UE may determine that the specific response is responding to the transmitted CG resource from a CG configuration with an ID of 1.

In some implementations, a DL-SSB ID field may be included in the DCI to identify the ID of the DL-SSB (e.g., SSB-Index) that the specific response corresponds to. For example, if a DL-SSB ID value of 1 is included in the DL-SSB ID field, the UE may determine that the specific response is responding to the transmitted CG resource that corresponds to a DL-SSB ID of 1.

In some implementations, a (e.g., one-bit) field may be included in the DCI to indicate ACK/NACK. For example, a first value in the field may indicate ACK, and a second value in the field may indicate NACK.

In some implementations, a (e.g., one-bit) field may be included in the DCI to indicate ACK/fallback. For example, a first value in the field may indicate ACK, and a second value in the field may indicate fallback.

In some implementations, a specific RNTI may be associated with the DCI to indicate ACK/NACK. For example, a first RNTI (e.g., C-RNTI) associated with the DCI may be used to indicate an ACK, and a second RNTI (e.g., CS-RNTI) associated with the DCI may be used to indicate a NACK.

In some implementations, a specific RNTI may be associated with the DCI to indicate ACK/fallback. For example, a first RNTI (e.g., C-RNTI) associated with the DCI may be used to indicate an ACK, and a second RNTI (e.g., CS-RNTI) associated with the DCI may be used to indicate a fallback.

In some implementations, a specific DCI format may be used to indicate ACK/NACK. For example, a first DCI format may be used to indicate an ACK, and a second DCI format may be used to indicate a NACK.

In some implementations, a specific DCI format may be used to indicate ACK/fallback. For example, a first DCI format may be used to indicate an ACK, and a second DCI format may be used to indicate a fallback.

In some implementations, an NDI field may be included in the DCI to indicate ACK/NACK. For example, a toggled NDI value compared to the NDI value in the previously received specific response (with the same HARQ process ID) may indicate an ACK, and a non-toggled NDI value compared to the NDI value in the previously received specific response (with the same HARQ process ID) may indicate a NACK.

In some implementations, an NDI field may be included in the DCI to indicate ACK/fallback. For example, a toggled NDI value compared to the NDI value in the previously received specific response (with the same HARQ process ID) may indicate an ACK, and a non-toggled NDI value compared to the NDI value in the previously received specific response (with the same HARQ process ID) may indicate a fallback.

In some implementations, the specific response may be MAC CE-based (e.g., a MAC CE). Moreover, the MAC CE-based specific response may be transmitted on a PDSCH scheduled by a DL assignment (e.g., a DCI that schedules the PDSCH where the MAC CE is transmitted). Moreover, the DL assignment may be transmitted on a specific search space/CORESET/PDCCH.

Specifically, the UE may be expected to receive the MAC CE-based specific response if it has indicated a preference of receiving MAC CE-based specific response to the network. For example, the UE may be expected to receive MAC CE-based specific response while the first timer (e.g., cg-SDT timer) is running only if the UE has indicated this preference to the network. Otherwise, the UE may be expected to receive DCI-based specific response while the first timer (e.g., cg-SDT timer) is running.

In some implementations, a HARQ ID field may be included in the DL assignment that schedules the PDSCH where the MAC CE is transmitted and/or the MAC CE. The HARQ ID field may be used to identify the HARQ process ID of the UL resource that the specific response corresponds to. For example, if a HARQ ID value of 1 is included in the HARQ ID field, the UE may determine that the specific response is responding to the transmitted UL resource with a HARQ ID of 1. The UL resource may be, for example, referred to a PUSCH resource scheduled by a dynamic grant and/or a CG resource.

In some implementations, a CG configuration ID field may be included in the DL assignment that schedules the PDSCH where the MAC CE is transmitted and/or the MAC CE. The CG configuration ID field may be used to identify the ID of the CG configuration (e.g., configuredGrantConfigIndex or configuredGrantConfigIndexMAC) that the specific response corresponds to. For example, if a CG configuration ID value of 1 is included in the CG configuration ID field, the UE may determine that the specific response is responding to the transmitted CG resource from a CG configuration with an ID of 1.

In some implementations, a DL-SSB ID field may be included in the DL assignment that schedules the PDSCH where the MAC CE is transmitted and/or the MAC CE. The DL-SSB ID field may be used to identify the ID of the DL-SSB (e.g., SSB-Index) that the specific response corresponds to. For example, if a DL-SSB ID value of 1 is included in the DL-SSB ID field, the UE may determine that the specific response is responding to the transmitted CG resource that corresponds to a DL-SSB ID of 1.

In some implementations, a (e.g., one-bit) field may be included in the DL assignment that schedules the PDSCH where the MAC CE is transmitted and/or the MAC CE. The field may be used to indicate ACK/NACK. For example, a first value in the field may indicate an ACK, and a second value in the field may indicate a NACK.

In some implementations, a (e.g., one-bit) field may be included in the DL assignment that schedules the PDSCH where the MAC CE is transmitted and/or the MAC CE. The field may be used to indicate ACK/fallback. For example, a first value in the field may indicate an ACK, and a second value in the field may indicate a fallback.

In some implementations, an NDI field may be included in the DL assignment that schedules the PDSCH where the MAC CE is transmitted. The NDI field may be used to indicate ACK/NACK. For example, a toggled NDI value compared to the NDI value in the previously received specific response (with the same HARQ process ID) may indicate an ACK, and a non-toggled NDI value compared to the NDI value in the previously received specific response (with the same HARQ process ID) may indicate a NACK.

In some implementations, an NDI field may be included in the DL assignment that schedules the PDSCH where the MAC CE is transmitted. The NDI field may be used to indicate ACK/fallback. For example, a toggled NDI value compared to the NDI value in the previously received specific response (with the same HARQ process ID) may indicate an ACK, and a non-toggled NDI value compared to the NDI value in the previously received specific response (with the same HARQ process ID) may indicate a fallback.

In some implementations, a bitmap of multiple bits may be included in the DL assignment that schedules the PDSCH where the MAC CE is transmitted and/or the MAC CE. The bitmap may be used to indicate ACK/NACK of multiple UL resources simultaneously. The UL resource may be, for example, referred to a PUSCH resource scheduled by a dynamic grant and/or a CG resource.

Specifically, every bit in the bitmap may correspond to a HARQ/CG configuration/DL-SSB ID that the transmitted CG resource corresponds to. A first value in a first bit may indicate an ACK for the HARQ/CG configuration/DL-SSB ID that corresponds to the first bit, and a second value in the first bit may indicate NACK for the HARQ/CG configuration/DL-SSB ID that corresponds to the first bit.

For example, the first bit in the bitmap may correspond to HARQ/CG configuration/DL-SSB ID of 1, the second bit in the bitmap may correspond to HARQ/CG configuration/DL-SSB ID of 2, and so on. In this case, the first value in the first bit may indicate ACK for HARQ/CG configuration/DL-SSB ID of 1, and the second value in the first bit may indicate NACK for HARQ/CG configuration/DL-SSB ID of 1. On the other hand, the first value in the second bit may indicate ACK for HARQ/CG configuration/DL-SSB ID of 2, and the second value in the second bit may indicate NACK for HARQ/CG configuration/DL-SSB ID of 2.

In some implementations, the specific response may be RRC message-based (e.g., an RRC message). Moreover, the RRC message may be transmitted on a PDSCH scheduled by a DL assignment (e.g., a DCI that schedules the PDSCH where the RRC message is transmitted). Moreover, the DL assignment may be transmitted on a specific search space/CORESET/PDCCH.

Specifically, the UE may be expected to receive the RRC message-based specific response if it has indicated a preference of receiving RRC message-based specific response to the network. For example, the UE may be expected to receive RRC message-based specific response while the first timer (e.g., cg-SDT timer) is running only if it has indicated this preference to the network. Otherwise, the UE may be expected to receive DCI-based specific response while the first timer (e.g., cg-SDT timer) is running.

In some implementations, a HARQ ID field may be included in the DL assignment that schedules the PDSCH where the RRC message is transmitted and/or the RRC message. The HARQ ID field may be used to identify the HARQ process ID of the UL resource that the specific response corresponds to. For example, if a HARQ ID value of 1 is included in the HARQ ID field, the UE may determine that the specific response is responding to the transmitted UL resource with an HARQ ID of 1. The UL resource may be, for example, referred to a PUSCH resource scheduled by a dynamic grant and/or a CG resource.

In some implementations, a CG configuration ID field may be included in the DL assignment that schedules the PDSCH where the RRC message is transmitted and/or the RRC message. The CG configuration ID field may be used to identify the ID of the CG configuration (e.g., configuredGrantConfigIndex or configuredGrantConfigIndex-MAC) that the specific response corresponds to. For example, if a CG configuration ID value of 1 is included in the CG configuration ID field, the UE may determine that the specific response is responding to the transmitted CG resource from a CG configuration with an ID of 1.

In some implementations, a DL-SSB ID field may be included in the DL assignment that schedules the PDSCH where the RRC message is transmitted and/or the RRC message. The DL-SSB ID field may be used to identify the ID of the DL-SSB (e.g., SSB-Index) that the specific response corresponds to. For example, if a DL-SSB ID value of 1 is included in the DL-SSB ID field, the UE may determine that the specific response is responding to the transmitted CG resource that corresponds to a DL-SSB ID of 1.

In some implementations, an NDI field may be included in the DL assignment that schedules the PDSCH where the RRC message is transmitted. The NDI field may be used to indicate ACK/NACK. For example, a toggled NDI value compared to the NDI value in the previously received specific response (with the same HARQ process ID) may indicate an ACK, and a non-toggled NDI value compared to the NDI value in the previously received specific response (with the same HARQ process ID) may indicate a NACK.

In some implementations, an NDI field may be included in the DL assignment that schedules the PDSCH where the RRC message is transmitted. The NDI field may be used to indicate ACK/fallback. For example, a toggled NDI value compared to the NDI value in the previously received specific response (with the same HARQ process ID) may indicate an ACK, and a non-toggled NDI value compared to the NDI value in the previously received specific response (with the same HARQ process ID) may indicate a fallback.

In some implementations, the specific response may be an RRC release message with suspendConfig IE. The RRC release message with suspendConfig IE may be transmitted on a PDSCH scheduled by a DL assignment (e.g., a DCI that schedules the PDSCH where the RRC message is transmitted). Moreover, the DL assignment may be transmitted on a specific search space/CORESET/PDCCH. Consequently, the UE may consider the RRC release message with suspendConfig IE to be an ACK in response to a transmitted RRC resume request message.

In some implementations, the specific response may be an RRC reject message, an RRC resume message, or an RRC release message without suspendConfig IE. The specific response may be transmitted on a PDSCH scheduled by a DL assignment (e.g., a DCI that schedules the PDSCH where the RRC message is transmitted). Moreover, the DL assignment may be transmitted on a specific search space/CORESET/PDCCH. Consequently, the UE may consider the specific response to be a NACK in response to a transmitted RRC resume request message.

Details of the first timer (e.g., cg-SDT timer) are exemplary described below.

In some implementations, the first timer (e.g., cg-SDT timer) may be used to define a period during which a UE may monitor on specific search space/CORESET/PDCCH for a specific response from the network. Specifically, the UE may monitor on specific search space/CORESET/PDCCH for possible transmission(s) of the specific response(s) while the first timer (e.g., cg-SDT timer) is running. On the other hand, if the first timer (e.g., cg-SDT timer) is not running (i.e., stopped or expired), the UE may not monitor on specific search space/CORESET/PDCCH for possible transmission(s) of the specific response(s).

In some implementations, if the first timer (e.g., cg-SDT timer) expires or stops, the UE may perform retransmission of a MAC PDU on a PUSCH for performing CG-based SDT procedure (e.g., a CG PUSCH).

In some cases, a first timer (e.g., cg-SDT timer) may be configured per HARQ process. The UE may start the first timer (e.g., cg-SDT timer), which corresponds to a first HARQ process, upon transmitting a first MAC PDU on a first PUSCH for performing the CG-based SDT procedure (e.g., a first CG PUSCH). The first PUSCH for performing the CG-based SDT procedure (e.g., the first CG PUSCH) may correspond to the first HARQ process. Subsequently, when the first timer (e.g., cg-SDT timer) expires, the UE may, or may be allowed to, perform retransmission of the first MAC PDU on a second PUSCH for performing the CG-based SDT procedure (e.g., a second CG PUSCH). The second PUSCH for performing the CG-based SDT procedure (e.g., the second CG PUSCH) may also correspond to the first HARQ process. In contrast, while the first timer (e.g., cg-SDT timer) is running, the UE may not, or may not be allowed to, perform retransmission of the first MAC PDU on the second PUSCH for performing CG-based SDT procedure (e.g., the second CG PUSCH).

In some implementations, the first timer (e.g., cg-SDT timer) may be equivalent to a configuredGrantTimer or a cg-RetransmissionTimer.

In some implementations, the first timer (e.g., cg-SDT timer) may be configured per DL-SSB configuration, per CG configuration, per BWP, per carrier, per UE, etc.

In some implementations, the first timer (e.g., cg-SDT timer) may be configured, by the network, via broadcast system information (e.g., SIB) and/or dedicated RRC signaling.

In some implementations, the first timer (e.g., cg-SDT timer) may be preconfigured in the UE.

In some implementations, the first timer (e.g., cg-SDT timer) may be configured in an RRC release message, e.g., configured in suspendConfig IE in the RRC release message.

In some implementations, the first timer (e.g., cg-SDT timer) may have a unit of symbols, slots, subframes, frames, milliseconds, seconds, multiples of periodicity of a CG configuration, multiples of periodicity of DL-SSBs, etc.

In some implementations, the first timer (e.g., cg-SDT timer) of a HARQ process/CG configuration/DL-SSB ID) may be (re) started at an offset after the UE transmits on a UL resource that corresponds to the HARQ process/CG configuration/DL-SSB ID. As such, the UE may be expected to receive a specific response from the network after transmission on the UL resource. As aforementioned, the specific response may be DCI-based, MAC CE-based, and/or RRC message-based, which has been described before and not repeated herein. The UL resource may be, for example, referred to a PUSCH resource scheduled by a dynamic grant and/or a CG resource.

In some implementations, the first timer (e.g., cg-SDT timer) of a HARQ process/CG configuration/DL-SSB ID may be (re) started at an offset after the UE receives a specific response indicating ACK/NACK/fallback for the corresponding HARQ process/CG configuration/DL-SSB ID. As aforementioned, the specific response may be DCI-based, MAC CE-based, and/or RRC message-based, which has been described before and not repeated herein.

For example, upon reception of a dynamic grant for scheduling a PUSCH resource which is used for retransmission of a TB that was transmitted on a UL resource, the UE may (re) start the first timer (e.g., cg-SDT timer) for the HARQ process of the transmitted UL resource. Note that the dynamic grant used to schedule a PUSCH resource for retransmission may be considered to be a specific response indicating a NACK in the example. In addition, the first timer (e.g., cg-SDT timer) for the HARQ process of the transmitted UL resource may be (re) started at an offset after receiving the dynamic grant.

In some implementations, the offset may be predefined in the UE or may be configured by the network. Moreover, the period may have a unit of symbols, slots, subframes, frames, milliseconds, seconds, multiples of periodicity of a CG configuration, multiples of periodicity of DL-SSBs, etc., which is not limited herein.

In some implementations, the first timer (e.g., cg-SDT timer) of a HARQ process/CG configuration/DL-SSB ID may be stopped when a specific response indicating ACK/NACK/fallback is received for the corresponding HARQ process/CG configuration/DL-SSB ID. As aforementioned, the specific response may be DCI-based, MAC CE-based, and/or RRC message-based, which has been described before and not repeated herein.

For example, a UE may transmit a UL resource of a HARQ process/CG configuration/DL-SSB ID and start the first timer (e.g., cg-SDT timer) for the HARQ process/CG configuration/DL-SSB ID. Subsequently, upon reception of a dynamic grant (e.g., DCI) scheduling a PUSCH resource for new transmission, the UE may stop the first timer (e.g., cg-SDT timer) for the HARQ process/CG configuration/DL-SSB ID of the transmitted UL resource. Note that the dynamic grant used to schedule a PUSCH resource for new transmission may be considered to be a specific response indicating an ACK in the present example. The UL resource may be, for example, referred to a PUSCH resource scheduled by a dynamic grant and/or a CG resource.

In some instances, the first timer (e.g., cg-SDT timer) for the HARQ process/CG configuration/DL-SSB ID of the transmitted UL resource may be (re) started at an offset after receiving the dynamic grant.

In some instances, the UE may determine that the dynamic grant (e.g., DCI) is for scheduling a PUSCH resource for new transmission if the dynamic grant (e.g., DCI) is associated with C-RNTI.

In some instances, the UE may determine that the dynamic grant (e.g., DCI) is for scheduling a PUSCH resource for new transmission if the NDI field of the dynamic grant (e.g., DCI) is toggled when comparing For another example, a UE may transmit a UL resource for a HARQ process/CG configuration/DL-SSB ID and start the first timer (e.g., cg-SDT timer) for the HARQ process/CG configuration/DL-SSB ID. In addition, an RRC resume request message may be transmitted on the UL resource. Subsequently, upon reception of an RRC release message with suspendConfig IE, the UE may stop the first timer (e.g., cg-SDT timer) for the HARQ process/CG configuration/DL-SSB ID of the transmitted UL resource. The UL resource may be, for example, referred to a PUSCH resource scheduled by a dynamic grant and/or a CG resource.

In some instances, the RRC release message with suspendConfig IE may be considered to be a specific response indicating an ACK.

In some implementations, the first timer (e.g., cg-SDT timer) for a HARQ process/CG configuration/DL-SSB ID may be stopped when the next CG resource for initial transmission for the HARQ process/CG configuration/DL-SSB ID becomes available for transmission. Alternatively, the duration of the first timer (e.g., cg-SDT timer) configured by the network may be shorter than the periodicity of the CG configuration.

In some implementations, the first timer (e.g., cg-SDT timer) may be stopped when a CG configuration is reconfigured by the network. For example, the network may include a CG configuration with a new set of parameters (e.g., periodicity) in the suspendConfig 1E of the RRC release message. In some instances, only the first timer (e.g., cg-SDT timer) configured in the CG configuration may be stopped.

In some implementations, the first timer (e.g., cg-SDT timer) may be stopped when a CG configuration is released/discarded/suspended. In some instances, only the first timer (e.g., cg-SDT timer) configured in the CG configuration may be stopped. In some instances, only the first timer (e.g., cg-SDT timer) configured in the DL-SSB corresponding to the CG configuration may be stopped.

In some implementations, the first timer (e.g., cg-SDT timer) may be stopped when a DL-SSB configuration is reconfigured/released/discarded.

In some implementations, the network may reconfigure the DL-SSB configuration via an RRC release message. For example, the network may include a DL-SSB configuration with a new set of parameters in the suspendConfig IE of the RRC release message. In some instances, only the first timer (e.g., cg-SDT timer) configured in the DL-SSB configuration may be stopped. In some instances, only the first timer (e.g., cg-SDT timer) configured in the CG configuration that corresponds to the DL-SSB configuration may be stopped.

In some implementations, the first timer (e.g., cg-SDT timer) may be stopped when a UE performs BWP switching from an old (UL/DL) BWP to a new (UL/DL) BWP. Note that this may be under the assumption that a UE in the RRC_INACTIVE state is configured with more than one BWPs.

In some implementations, the old BWP may be an initial BWP and the new BWP may be a dedicated BWP. In some implementations, the old BWP may be a dedicated BWP and the new BWP may be an initial BWP. When the UE switches from an old BWP to a new BWP, the UE deactivates the old BWP and activates the new BWP. In some instances, only the first timer (e.g., cg-SDT timer) configured in the old BWP may be stopped. In some instances, only the first timer (e.g., cg-SDT timer) configured in the CG/DL-SSB configuration from the old BWP may be stopped.

In some implementations, the first timer (e.g., cg-SDT timer) may be stopped when an RA procedure is initiated, where the RA procedure may be a 2-step RA or a 4-step RA. In some cases, the RA procedure may be initiated due to the reception of a specific response with a fallback indication. In some cases, the RA procedure may be initiated for SDT. For example, the RA procedure may be initiated for SDT in a case that certain conditions to initiate SDT are satisfied.

The UE may reset the (first) counter (e.g., UL_skipping_COUNTER) based on at least one conditions. For example, the UE may reset the (first) counter (e.g., UL_skipping_COUNTER) to a value (e.g., "0") based on at least one conditions. The at least one condition is exemplary described by several implementations below.

In some implementations, the (first) counter (e.g., UL_skipping_COUNTER) may be reset if a UE successfully transmits on a UL resource. In some cases, the (first) counter (e.g., UL_skipping_COUNTER) may be reset if a UE successfully transmits on a UL resource and the UL resource includes a specific type of data and/or MAC CE.

In some implementations, the (first) counter (e.g., UL_skipping_COUNTER) maintained in a (subset of) CG configuration may be reset if the UE successfully transmits on a CG resource that corresponds to the (subset of) CG configuration. In some cases, the (first) counter (e.g., UL_skipping_COUNTER) maintained in a CG configuration may be reset if the UE successfully transmits on a CG resource that corresponds to the CG configuration and the CG resource includes a specific type of data and/or MAC CE.

In some implementations, the (first) counter (e.g., UL_skipping_COUNTER) maintained in a group of multiple CG configurations may be reset if the UE successfully transmits on a CG resource that corresponds to the group. In some cases, the (first) counter (e.g., UL_skipping_ COUNTER) maintained in a group of multiple CG configurations may be reset if the UE successfully transmits on a CG resource that corresponds to the group and the CG resource includes a specific type of data and/or MAC CE.

In some implementations, the (first) counter (e.g., UL_skipping_COUNTER) maintained in a BWP/carrier may be reset if the UE successfully transmits on a UL resource that is configured/scheduled in the BWP/carrier. In some cases, the (first) counter (e.g., UL_skipping_ COUNTER) maintained in a BWP/carrier may be reset if the UE successfully transmits on a UL resource that is configured/scheduled in the BWP/carrier and the UL resource includes a specific type of data and/or MAC CE. The carrier may be, for example, referred to a NUL/SUL carrier. The UL resource may be, for example, referred to a PUSCH resource scheduled by a dynamic grant (e.g., associated with C-RNTI/CS-RNTI) and/or a CG resource.

In some implementations, the (first) counter (e.g., UL_skipping_COUNTER) maintained in a DL-SSB configuration may be reset if the UE successfully transmits on a CG resource that corresponds to the DL-SSB configuration. In some cases, the (first) counter (e.g., UL_skipping_ COUNTER) maintained in a DL-SSB configuration may be reset if the UE successfully transmits on a CG resource that corresponds to the DL-SSB configuration and the CG resource includes a specific type of data and/or MAC CE. The specific type of data may be, for example, referred to as data from a specific LCH. The specific type of MAC CE may be, for example, referred to as data from a specific LCH.

In some implementations, the UE may determine that it successfully transmits on a UL resource if it receives a specific response indicating an ACK from the network in response to the transmitted UL resource. The UL resource may be, for example, referred to a PUSCH resource scheduled by a dynamic grant and/or a CG resource.

In some implementations, the UE may determine that it successfully transmits on a UL resource that corresponds to a HARQ process/CG configuration/DL-SSB ID if the first timer (e.g., cg-SDT timer) for the HARQ process/CG configuration/DL-SSB ID has expired/stopped. The UL resource may be, for example, referred to a PUSCH resource scheduled by a dynamic grant and/or a CG resource.

In some implementations, the (first) counter (e.g., UL_skipping_COUNTER) may be reset if a UE receives a specific response indicating a fallback from the network. In some cases, all the (first) counters (e.g., UL_skipping_ COUNTERs) of the UE may be reset if a UE receives the specific response indicating a fallback from the network.

In some implementations, the (first) counter (e.g., UL_skipping_COUNTER) may be reset if a CG configuration is reconfigured. For example, the network may reconfigure the CG configuration using an RRC release message. For example, the network may include a CG configuration with a new set of parameters in the suspendConfig IE of the RRC release message. In some cases, only the (first) counter (e.g., UL_skipping_COUNTER) for the CG configuration may be reset. In some cases, only the (first) counter (e.g., UL_skipping_COUNTER) for the DL-SSB that corresponds to the CG configuration may be reset.

In some implementations, the (first) counter (e.g., UL_skipping_COUNTER) may be reset if a CG configuration is released/discarded/suspended. In some cases, only the (first) counter (e.g., UL_skipping_COUNTER) for the CG configuration may be reset. In some cases, only the (first) counter (e.g., UL_skipping_COUNTER) for the DL-SSB that corresponds to the CG configuration may be reset.

In some implementations, the (first) counter (e.g., UL_skipping_COUNTER) may be reset when a DL-SSB configuration is reconfigured/released/discarded. For example, the network may reconfigure the DL-SSB configuration via an RRC release message. For example, the network may include a DL-SSB configuration with a new set of parameters in the suspendConfig 1E of the RRC release message. In some cases, only the (first) counter (e.g., UL_skipping_COUNTER) for the DL-SSB configuration may be reset. In some cases, only the (first) counter (e.g., UL_skipping_COUNTER) for the CG configuration that corresponds to the DL-SSB configuration may be reset.

In some implementations, the (first) counter (e.g., UL_skipping_COUNTER) may be reset when a UE performs BWP switching from an old (UL/DL) BWP to a new (UL/DL) BWP. Note that this may be under the assumption that a UE in the RRC_INACTIVE state is configured with more than one BWPs. For example, the old BWP may be an initial BWP and the new BWP may be a dedicated BWP or vice versa. When the UE switches from an old BWP to a new BWP, the UE deactivates the old BWP and activates the new BWP. In some cases, only the (first) counter (e.g., UL_skipping_COUNTER) for the old BWP may be stopped. In some cases, only the (first) counter (e.g., UL_skipping_ COUNTER) for the CG/DL-SSB configuration from the old BWP may be stopped.

In some implementations, the (first) counter (e.g., UL_skipping_COUNTER) may be reset when a RA procedure is initiated, where the RA procedure may be a 2-step RA or a 4-step RA. In some cases, the RA procedure may be initiated due to the reception of a specific response with a fallback indication. In some cases, the RA procedure may be initiated for SDT if the conditions to initiate an SDT procedure are satisfied. In some cases, all the (first) counters (e.g., UL_skipping_COUNTERs) of the UE may be reset if a UE receives the specific response indicating a fallback from the network.

In some implementations, the (first) counter (e.g., UL_skipping_COUNTER) may be reset if the UE receives a specific indication.

In some implementations, the specific indication may be included in a broadcast system information (e.g., SIB). 'The specific indication may indicate that SDT using CG resource in the RRC_INACTIVE state is no longer supported in the cell (e.g., when connected to 5GC). In some cases, all the (first) counters (e.g., UL_skipping_COUNTERs) of the UE may be reset if a UE receives the specific response indicating a fallback from the network.

In some implementations, the (first) counter (e.g., UL_skipping_COUNTER) may be reset if a second timer (e.g., T_reset-skipping) has expired. Note that the details of the second timer (e.g., T_reset-skipping) are described in the following descriptions.

In some implementations, the (first) counter (e.g., UL_skipping_COUNTER) maintained in a (subset of) CG configuration may be reset if the second timer (e.g., T_reset-skipping) that corresponds to the (subset of) CG configuration has expired.

In some implementations, the (first) counter (e.g., UL_skipping_COUNTER) maintained in a group of multiple CG configurations may be reset if the second timer (e.g., T_reset-skipping) that corresponds to the group has expired.

In some implementations, the (first) counter (e.g., UL_skipping_COUNTER) maintained in a BWP/carrier may be reset if the second timer (e.g., T_reset-skipping) that corresponds to the BWP/carrier has expired.

In some implementations, the (first) counter (e.g., UL_skipping_COUNTER) maintained in a DL-SSB configuration may be reset if the second timer (e.g., T_reset-skipping) that corresponds to the DL-SSB configuration has expired.

In some implementations, the (first) counter (e.g., UL_skipping_COUNTER) may be reset if a measurement of the DL-SSB is below a threshold (e.g., threshold_DL_measurement).

In some cases, the (first) counter (e.g., UL_skipping_COUNTER) may be reset when no DL-SSB corresponding to a CG configuration is qualified. For example, the UE determines that none of the configured DL-SSBs corresponding to a CG configuration has a measured DL RSRP of higher than a threshold (e.g., threshold_DL_measurement).

In some implementations, the (first) counter (e.g., UL_skipping_COUNTER) maintained in a CG configuration may be reset when no DL-SSB corresponding to a CG configuration is qualified. For example, the UE determines that none of the configured DL-SSBs corresponding to a CG configuration has a measured DL RSRP of higher than a threshold (e.g., threshold_DL_measurement).

In some implementations, the (first) counter (e.g., UL_skipping_COUNTER) may be reset if a UE requests to release the CG resource.

In some implementations, the UE may request to release one or multiple CG configuration via a dedicated RRC message. Moreover, the UE may reset the (first) counter (e.g., UL_skipping_COUNTER) if it successfully transmits the dedicated RRC message to the gNB.

For example, the UE may reset the (first) counter (e.g., UL_skipping_COUNTER) maintained in a CG configuration if it successfully transmits the dedicated RRC message to the gNB to request for releasing of the corresponding CG configuration.

In some implementations, the (first) counter (e.g., UL_skipping_COUNTER) may be reset when a CG resource/configuration is determined as not valid.

In some implementations, the (first) counter (e.g., UL_skipping_COUNTER) maintained in a CG configuration may be reset when the CG resource/configuration is determined as not valid.

In some implementations, the (first) counter (e.g., UL_skipping_COUNTER) maintained in the DL-SSB configuration that a CG configuration corresponds to may be reset may be reset when the CG resource/configuration is determined as not valid.

In some implementations, the UE may determine whether a CG resource/configuration is valid based on one or more of the following criteria (a) to (e).

(a) The UE may determine whether a CG resource/configuration is valid based on whether the associated beam is valid, and whether the associated beam is valid may be based on a RSRP threshold. For example, if there is at least one beam with RSRP above the RSRP threshold, the UE may determine that the CG resource/configuration is valid. Otherwise, if there is no beam with RSRP above the RSRP threshold, the UE may determine that the CG resource/configuration is not valid.

(b) The UE may determine whether a CG resource/configuration is valid based on whether TA is valid. For example, the UE may determine that the CG resource/configuration is valid while the TA is valid. Otherwise, if the TA is not valid, the UE may determine that the CG resource/configuration is not valid.

In some implementations, whether a TA is valid may be based on whether a cg-SDT-TimeAlignmentTimer has expired. For example, the UE may consider that the TA is valid while the cg-SDT-TimeAlignmentTimer is running, otherwise, the UE may consider that the TA is not valid while the cg-SDT-TimeAlignmentTimer has expired or is not running.

In some implementations, whether a TA is valid may be based on an RSRP change volume. For example, the UE may consider that the TA is not valid if the RSRP change volume is higher than a threshold.

(c) The UE may determine whether a CG resource/configuration is valid based on whether CG resource configuration is valid.

In some implementations, when the CG resource configuration is initialized, the CG resource configuration may be valid.

In some implementations, when the CG resource configuration is released/suspended, the CG resource configuration may be invalid.

(d) The UE may determine whether a CG resource/configuration is valid based on whether an RSRP is larger than the configured RSRP threshold (pre) configured for SDT.

(e) The UE may determine whether a CG resource/configuration is valid based on whether a timer (e.g., T319 or a timer similar to T319) is running. For example, the UE may determine that the CG resource/configuration is valid while the timer is running. Otherwise, the UE may determine that CG resource/configuration is not valid while the timer is not running or when the timer expires.

In some implementations, the timer may be used to detect the failure of the SDT.

In some implementations, the timer may be (re-) started upon transmission of UL data when the UE is in the RRC_INACTIVE state. In some implementations, the timer may be (re-) started upon transmission of small data. In some implementations, the timer may be (re-) started upon transmission of an RRC resume request message.

In some implementations, the timer may be stopped upon reception of an RRC resume (e.g., RRCResume) message, an RRC setup (e.g., RRCSetup) message, an RRC release (e.g., RRCRelease) message, an RRC release message with suspendConfig or an RRC reject (e.g., RRCReject) message, cell re-selection and upon abortion of connection establishment by upper layers.

In some implementations, once the timer expires, the UE may perform the specific actions upon transitioning to RRC_IDLE (e.g., MAC reset, stop all running timers, discard UE Inactive AS context, release the suspendConfig, enter RRC_IDLE and perform cell selection, etc.).

Details of the second timer (e.g., T_reset-skipping) are exemplary described below.

In some implementations, the UE may reset the (first) counter (e.g., UL_skipping_COUNTER) if the (first) counter (e.g., UL_skipping_COUNTER) has not been incremented within the period defined by the second timer (e.g., T_reset-skipping).

In some implementations, the second timer (e.g., T_reset-skipping) may be configured per DL-SSB configuration, per CG configuration, per BWP, per carrier, per UE, etc., which is not limiter herein.

In some implementations, the second timer (e.g., T_reset-skipping) may be configured by the network via broadcast system information (e.g., SIB) and/or dedicated RRC signaling.

In some implementations, the second timer (e.g., T_reset-skipping) may be preconfigured in the UE.

In some implementations, the second timer (e.g., T_reset-skipping) may be configured in RRC release message, e.g., in suspendConfig IE in the RRC release message.

In some implementations, the second timer (e.g., T_reset-skipping) may have a unit of symbols, slots, subframes, frames, milliseconds, seconds, multiples of periodicity of a CG configuration, multiples of periodicity of DL-SSBs, etc., which is not limited herein.

In some implementations, the second timer (e.g., T_reset-skipping) of a CG/DL-SSB/BWP configuration may be (re) started if the conditions to increment the (first) counter (e.g., UL_skipping_COUNTER) of the CG/DL-SSB/BWP configuration has been satisfied. For example, the second timer (e.g., T_reset-skipping) may be (re) started if the UE skips a transmission on a UL resource. The UL resource may be, for example, referred to a PUSCH resource scheduled by a dynamic grant and/or a CG resource.

In some implementations, the second timer (e.g., T_reset-skipping) of a CG/DL-SSB/BWP configuration may be (re) started if the (first) counter (e.g., UL_skipping_COUNTER) of the CG/DL-SSB/BWP configuration has been incremented.

In some implementations, the second timer (e.g., T_reset-skipping) of a CG/DL-SSB/BWP configuration may be stopped when a specific response indicating ACK/NACK/fallback is received for the CG/DL-SSB/BWP configuration. Moreover, the specific response may be DCI-based, MAC CE-based, and/or RRC message-based, which is not limited herein.

In some implementations, the second timer (e.g., T_reset-skipping) may be stopped when a CG configuration is reconfigured by the network. For example, the network may periodically reconfigure the CG configuration using an RRC release message. For example, the network may include a CG configuration with a new set of parameters (e.g., periodicity) in the suspendConfig IE of the RRC release message. In some instances, only the second timer (e.g., T_reset-skipping) configured in the CG configuration may be stopped.

In some implementations, the second timer (e.g., T_reset-skipping) may be stopped when a CG configuration is released/discarded/suspended. In some instances, only the second timer (e.g., T_reset-skipping) configured in the CG configuration may be stopped. In some instances, only the second timer (e.g., T_reset-skipping) configured in the DL-SSB corresponding to the CG configuration may be stopped.

In some implementations, the second timer (e.g., T_reset-skipping) may be stopped when a DL-SSB configuration is reconfigured/released/discarded.

In some implementations, the network may reconfigure the DL-SSB configuration via an RRC release message. For example, the network may include a DL-SSB configuration with a new set of parameters in the suspendConfig IE of the RRC release message. In some instances, only the second timer (e.g., T_reset-skipping) configured in the DL-SSB configuration may be stopped. In some instances, only the second timer (e.g., T_reset-skipping) configured in the CG configuration that corresponds to the DL-SSB configuration may be stopped.

In some implementations, the second timer (e.g., T_reset-skipping) may be stopped when a UE performs BWP switching from an old (UL/DL) BWP to a new (UL/DL) BWP. Note that this may be under the assumption that a UE in the RRC_INACTIVE state is configured with more than one BWPs.

In some implementations, the old BWP may be an initial BWP and the new BWP may be a dedicated BWP. In some implementations, the old BWP may be a dedicated BWP and the new BWP may be an initial BWP. When the UE switches from an old BWP to a new BWP, the UE deactivates the old BWP and activates the new BWP. In some instances, only the second timer (e.g., T_reset-skipping) configured in the old BWP may be stopped. In some instances, only the second timer (e.g., T_reset-skipping) configured in the CG/DL-SSB configuration from the old BWP may be stopped.

In some implementations, the second timer (e.g., T_reset-skipping) may be stopped when a RA procedure is initiated, where the RA procedure may be a 2-step RA or a 4-step RA. In some cases, the RA procedure may be initiated due to the reception of a specific response with a fallback indication. In some cases, the RA procedure may be initiated for SDT. For example, the RA procedure may be initiated for SDT in a case that certain conditions to initiate SDT are satisfied.

As aforementioned, once the UE considers that the specific number of (consecutive) UL transmission have been skipped and/or the specific number of (consecutive) UL transmission failures have been occurred, it may perform at least one of a plurality of actions. In some implementations, in a case that the (first) counter (e.g., UL_skipping_COUNTER) reaches a specific number (e.g., max-UL-skipping) and/or a specific number (e.g., max-UL-skipping)

of consecutive UL resources have been skipped, the UE may perform at least one of a plurality of actions.

The plurality of actions includes Action 1 to Action 9, which are described below.

Action 1: Release/discard/suspend the CG configuration(s).

In some implementations, if the (first) counter (e.g., UL_skipping_COUNTER) reaches a specific number (e.g., max-UL-skipping), the UE may release/discards/suspends all the configured CG configurations.

In some implementations, if the (first) counter (e.g., UL_skipping_COUNTER) reaches a specific number (e.g., max-UL-skipping) configured for a CG configuration, the UE may release/discards/suspends the corresponding CG configuration.

In some implementations, if the (first) counter (e.g., UL_skipping_COUNTER) reaches a specific number (e.g., max-UL-skipping) configured for a group of CG configurations, the UE may release/discards/suspends CG configurations of the group.

In some implementations, if the (first) counter (e.g., UL_skipping_COUNTER) reaches a specific number (e.g., max-UL-skipping) configured for a BWP/carrier, the UE may release/discards/suspends CG configuration that is configured at the BWP/carrier.

In some implementations, if the (first) counter (e.g., UL_skipping_COUNTER) reaches a specific number (e.g., max-UL-skipping) configured for a DL-SSB configuration, the UE may release/discards/suspends CG configuration that corresponds to the DL-SSB configuration.

In some implementations, if a specific number (e.g., max-UL-skipping) of consecutive UL resources have been skipped, the UE may release/discards/suspends all the configured CG configurations.

In some implementations, if a specific number (e.g., max-UL-skipping) of consecutive UL resources that corresponds to a configured grant configuration have been skipped, the UE may release/discards/suspends the corresponding CG configuration.

In some implementations, if a specific number (e.g., max-UL-skipping) of consecutive UL resources that corresponds to a group of configured grant configurations have been skipped, the UE may release/discards/suspends the CG configurations from the group.

In some implementations, if a specific number (e.g., max-UL-skipping) of consecutive UL resources configured for a BWP/carrier have been skipped, the UE may release/discards/suspends the CG configurations from the BWP/carrier.

In some implementations, if a specific number (e.g., max-UL-skipping) of consecutive UL resources configured for a DL-SSB configuration have been skipped, the UE may release/discards/suspends the CG configuration corresponding to the DL-SSB configuration.

As aforementioned, the UL resource may be, for example, referred to a PUSCH resource scheduled by a dynamic grant and/or a CG resource.

Action 2: Discard/suspend the DL-SSB configuration(s).

In some implementations, if the (first) counter (e.g., UL_skipping_COUNTER) reaches a specific number (e.g., max-UL-skipping), the UE may release/discards all the DL-SSB configurations.

In some implementations, if the (first) counter (e.g., UL_skipping_COUNTER) reaches a specific number (e.g., max-UL-skipping) configured for a CG configuration, the UE may release/discards the DL-SSB configuration(s) that corresponds to the CG configuration.

In some implementations, if the (first) counter (e.g., UL_skipping_COUNTER) reaches a specific number (e.g., max-UL-skipping) configured for a group of CG configurations, the UE may release/discards DL-SSB configuration(s) that corresponds to the group.

In some implementations, if the (first) counter (e.g., UL_skipping_COUNTER) reaches a specific number (e.g., max-UL-skipping) configured for a BWP/carrier, the UE may release/discards DL-SSB configuration(s) that corresponds to the CG configuration on the BWP/carrier.

In some implementations, if the (first) counter (e.g., UL_skipping_COUNTER) reaches a specific number (e.g., max-UL-skipping) configured for a DL-SSB configuration, the UE may release/discards/suspends the corresponding DL-SSB configuration.

In some implementations, if a specific number (e.g., max-UL-skipping) of consecutive UL resources have been skipped, the UE may release/discards all the DL-SSB configurations.

In some implementations, if a specific number (e.g., max-UL-skipping) of consecutive UL resources that correspond to a configured grant configuration have been skipped, the UE may release/discards the DL-SSB configuration(s) that corresponds to the CG configuration.

In some implementations, if a specific number (e.g., max-UL-skipping) of consecutive UL resources that correspond to a group of configured grant configurations have been skipped, the UE may release/discards DL-SSB configuration(s) that corresponds to the group.

In some implementations, if a specific number (e.g., max-UL-skipping) of consecutive UL resources configured for a BWP/carrier have been skipped, the UE may release/discards DL-SSB configuration(s) that corresponds to the CG configuration on the BWP/carrier.

In some implementations, if a specific number (e.g., max-UL-skipping) of consecutive UL resources configured for a DL-SSB configuration have been skipped, the UE may release/discards the corresponding DL-SSB configuration.

As aforementioned, the UL resource may be, for example, referred to a PUSCH resource scheduled by a dynamic grant and/or a CG resource.

Action 3: Initiate an RRC resume procedure.

In some implementations, if the (first) counter (e.g., UL_skipping_COUNTER) reaches a specific number (e.g., max-UL-skipping), the UE may initiate an RRC resume procedure. Moreover, the UE may transmit an RRC resume request message as part of the RRC resume procedure.

In some implementations, if a specific number (e.g., max-UL-skipping) of consecutive UL resources have been skipped, the UE may initiate an RRC resume procedure. Moreover, the UE may transmit an RRC resume request message as part of the RRC resume procedure.

As aforementioned, the UL resource may be, for example, referred to a PUSCH resource scheduled by a dynamic grant and/or a CG resource.

Action 4: Send a confirmation message to the network.

In some implementations, if the (first) counter (e.g., UL_skipping_COUNTER) reaches a specific number (e.g., max-UL-skipping) and/or a specific number (e.g., max-UL-skipping) of consecutive UL resources have been skipped, the UE may send a confirmation message to the network. Specifically, the UE may trigger a confirmation procedure if the (first) counter (e.g., UL_skipping_COUNTER) reaches the specific number (e.g., max-UL-skipping) and/or the specific number (e.g., max-UL-skipping) of consecutive UL resources have been skipped. Subsequently, when an UL resource become available, the UE generate a confirmation message for transmission on the UL resource if it has a triggered confirmation procedure. The UE may cancel the triggered confirmation procedure after generating the confirmation message or after transmitting the confirmation message. As aforementioned, the UL resource may be, for example, referred to a PUSCH resource scheduled by a dynamic grant and/or a CG resource.

In some implementations, the UE may release/discard/suspend the CG configuration after transmitting the confirmation message or after the triggered confirmation procedure has been canceled.

In some implementations, the UE may release/discard/suspend the DL-SSB configuration after transmitting the confirmation message or after the triggered confirmation procedure has been canceled.

In some implementations, the UE may transmit the confirmation message on the CG resource that needs to be released/discarded/suspended.

In some implementations, the UE may transmit the confirmation on the PUSCH resource scheduled by a dynamic grant.

In some implementations, the confirmation message may be used to indicate the network that the UE has released/discarded/suspended one or multiple specific CG configurations.

In some implementations, the confirmation message may be used to indicate the network that the UE has released/discarded one or multiple DL-SSB configurations.

In some implementations, the confirmation message may be used to indicate the network that one or multiple specific CG configurations can be released/discarded/suspended.

In some implementations, the confirmation message may be used to indicate the network that the UE would like to release one or multiple CG configurations and/or one or multiple DL-SSB configurations.

In some implementations, the confirmation message may identify the CG configuration(s) and/or DL-SSB configuration(s) that needs to be released/discarded/suspended. For example, the index(es) of the CG configuration(s) and/or the DL-SSB configuration(s) may be included in the confirmation message.

In some implementations, a bitmap of multiple bits may be included in confirmation message. The bitmap may be used to indicate multiple CG configurations and/or DL-SSB configurations that needs to be released/discarded/suspended.

Specifically, every bit in the bitmap may correspond to a HARQ/CG configuration and/or DL-SSB ID that the transmitted UL resource corresponds to. The UL resource may be, for example, referred to a PUSCH resource scheduled by a dynamic grant and/or a CG resource. A first value in a first bit may indicate that the CG/DL-SSB configuration that corresponds to the first bit may be released/discarded/suspended, and a second value in the first bit may indicate that the CG/DL-SSB configuration that corresponds to the first bit may not be released/discarded/suspended.

For example, the first bit in the bitmap may correspond to CG/DL-SSB configuration with ID of 1, the second bit in the bitmap may correspond to CG/DL-SSB configuration with ID of 2, and so on.

In some implementations, the confirmation message may be a MAC CE.

In some cases, the MAC CE may be identified by a MAC subheader with a specific LCID value.

In some cases, the MAC CE may have a fixed size of zero bits.

In some cases, the MAC CE may be transmitted on a CG resource that corresponds to a CG configuration to be released/discarded/suspended.

Action 5: Send a beam report to the network.

In some implementations, if the (first) counter (e.g., UL_skipping_COUNTER) reaches a specific number (e.g., max-UL-skipping) and/or a specific number (e.g., max-UL-skipping) of consecutive UL resources have been skipped, the UE may send a beam report to the network. Specifically, the UE may trigger a beam reporting procedure if the (first) counter (e.g., UL_skipping_COUNTER) reaches the specific number (e.g., max-UL-skipping) and/or the specific number (e.g., max-UL-skipping) of consecutive UL resources have been skipped. Subsequently, when an UL resource become available, the UE generate a beam report for transmission on the UL resource if it has a triggered beam reporting procedure. The UE may cancel the triggered beam reporting procedure after generating the beam report or after transmitting the beam report.

As aforementioned, the UL resource may be, for example, referred to a PUSCH resource scheduled by a dynamic grant and/or a CG resource.

In some implementations, the beam report may be transmitted on a CG resource (e.g., which is to be released/discarded/suspended), PUSCH scheduled by dynamic grant, and/or MSGA/msg3.

In some implementations, the beam report may include a DL-SSB index field. The DL-SSB index field may indicate the index(es) of one or more DL-SSBs that corresponds to a CG configuration. Moreover, the measured DL RSRP of each of the one or more DL-SSBs may be equal to/higher than a RSRP threshold (e.g., threshold_DL_measurement) configured for the CG configuration. The DL-SSB index field may be used to inform the network which DL-SSB(s) has good DL RSRP from the UE's perspective.

Note that the RSRP threshold (e.g., threshold_DL_measurement) may be configured to a UE via broadcast system information and/or dedicated RRC signaling (e.g., RRC release message). Moreover, the RSRP threshold (e.g., threshold_DL_measurement) may also be configured per (group of) CG configuration, per BWP (e.g., dedicated BWP, initial BWP, etc.), per carrier (e.g., NUL/SUL), per (group of) DL-SSB configuration, etc., which is not limited herein.

In some implementations, the beam report may include a field to indicate the presence of the DL-SSB index field. For example, if at least one measured DL RSRP of at least one DL-SSB among the DL-SSBs in the configured DL-SSB list (e.g., a list of one or multiple DL-SSBs that correspond to a CG configuration) is equal to/higher than the RSRP threshold (e.g., threshold_DL_measurement), the field may be set to a first value (e.g., 1). Otherwise, it may be set to a second value (e.g., 0).

In some implementations, the beam report may include a field which is set to the index of an DL-SSB with DL RSRP equal to/higher than the RSRP threshold (e.g., threshold_DL_measurement) amongst the DL-SSBs in the configured DL-SSB list.

Moreover, the measurement result of this DL-SSB may be included in the field (e.g., the value of measured DL RSRP of this DL-SSB).

Action 6: Release the cg-SDT-TimeAlignmentTimer.

In some implementations, if the (first) counter (e.g., UL_skipping_COUNTER) reaches a specific number (e.g., max-UL-skipping) and/or a specific number (e.g., max-UL-skipping) of consecutive UL resources have been skipped, the UE may release the cg-SDT-TimeAlignmentTimer.

As aforementioned, the UL resource may be, for example, referred to a PUSCH resource scheduled by a dynamic grant and/or a CG resource.

In some cases, the RRC layer of the UE may inform the MAC layer of the UE to release cg-SDT-TimeAlignment-Timer.

Action 7: Initiate an RA procedure.

In some implementations, if the (first) counter (e.g., UL_skipping_COUNTER) reaches a specific number (e.g., max-UL-skipping) and/or a specific number (e.g., max-UL-skipping) of consecutive UL resources have been skipped, the UE may initiate an RA procedure.

As aforementioned, the UL resource may be, for example, referred to a PUSCH resource scheduled by a dynamic grant and/or a CG resource.

Action 8: Send a BSR report.

In some implementations, if the (first) counter (e.g., UL_skipping_COUNTER) reaches a specific number (e.g., max-UL-skipping) and/or a specific number (e.g., max-UL-skipping) of consecutive UL resources have been skipped, the UE may send a BSR report. Specifically, the UE may trigger a BSR procedure if the (first) counter (e.g., UL_skipping_COUNTER) reaches the specific number (e.g., max-UL-skipping) and/or the specific number (e.g., max-UL-skipping) of consecutive UL resources have been skipped. Subsequently, when an UL resource become available, the UE generate a BSR for transmission on the UL resource if it has a triggered BSR procedure. The UE may cancel the triggered BSR procedure after generating the BSR report or after transmitting the BSR report. The UL resource may be, for example, referred to a PUSCH resource scheduled by a dynamic grant and/or a CG resource. The BSR report may be, for example, a short BSR report or a long BSR report. The BSR report may, for example, indicate a buffer status as 0 (for all the LCGs)

Action 9: Transit to the RRC_IDLE state.

Figure 5:
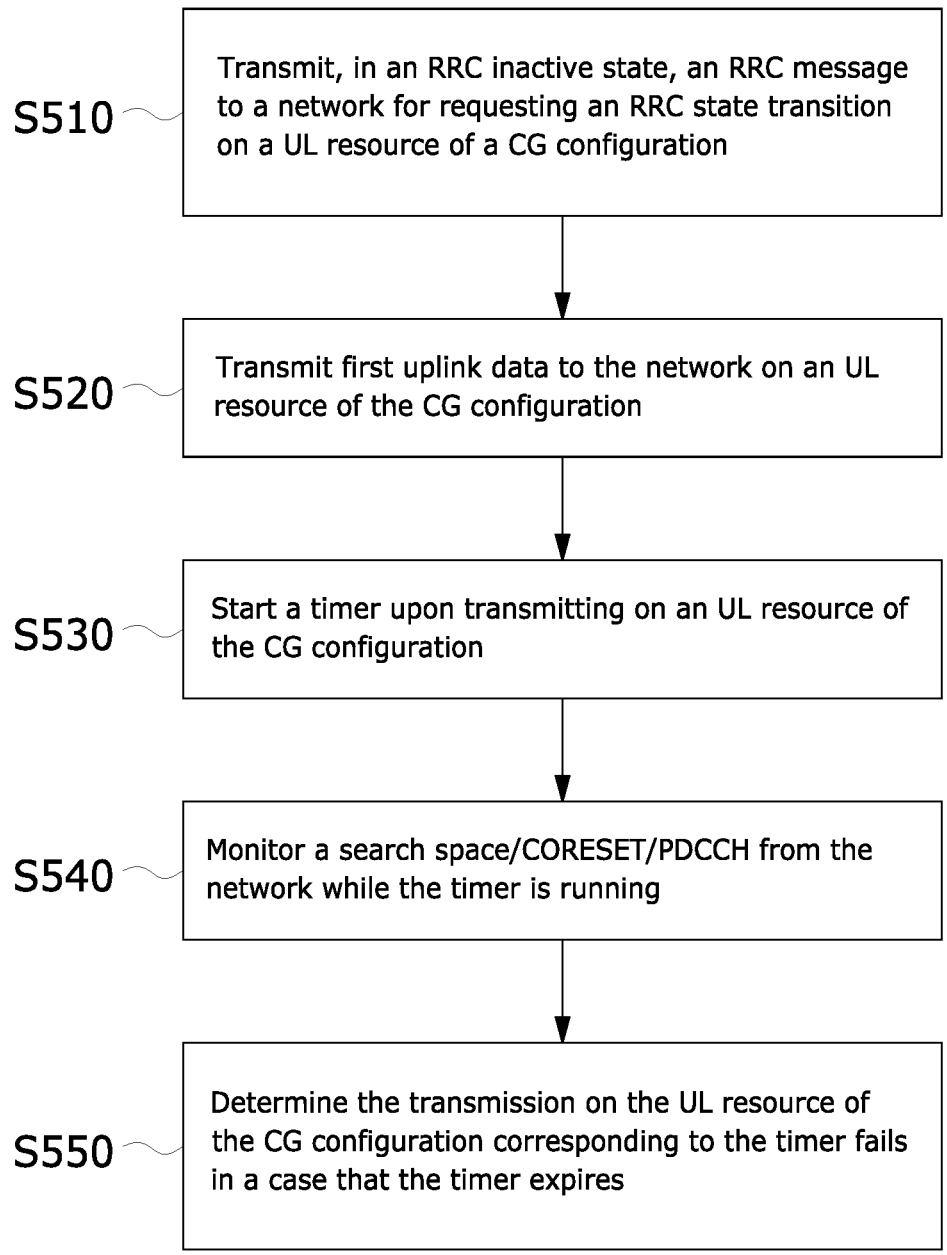
FIG. 5 is a flowchart illustrating a method performed by a UE for CG-based data transmission according to an example implementation of the present application.

In some implementations, if the (first) counter (e.g., UL_skipping_COUNTER) reaches a specific number (e.g., max-UL-skipping) and/or a specific number (e.g., max-UL-skipping) of consecutive UL resources have been skipped, the UE may transit to the RRC_IDLE state. FIG. 5 is a flowchart illustrating a method performed by a UE for CG-based data transmission according to an example implementation of the present application.

Referring to FIG. 5, although steps S510 to S550 are illustrated as separate steps represented as independent blocks, these separately illustrated actions should not be construed as necessarily order dependent. The order in which the steps are performed in FIG. 5 is not intended to be construed as a limitation, and any number of the disclosed blocks may be combined in any order to implement the method, or an alternate method.

The data transmitted in the method illustrated in FIG. 5 may be small data in some implementations. The method for the CG-based data transmission illustrated in FIG. 5 may be consistent with at least part of the procedure for the CG-based SDT illustrated in FIG. 2 and descriptions of FIG. 5 may be read with reference to FIG. 2 and previous associated paragraphs. It is noted that the method illustrated in FIG. 5 may be performed by a UE for communicating with a network (e.g., a base station) as illustrated in FIG. 2. It is further noted that uplink data transmitted in the method of FIG. 5 may be referred to small data as illustrated in FIG. 2, but which is not limited herein.

Referring to FIG. 5, in step S510, the UE in an RRC inactive state may transmit an RRC message to a network (e.g., a base station) for requesting an RRC state transition on a UL resource (e.g., PUSCH) of a CG configuration.

In some implementations, the UE may receive the CG configuration from the network when the UE is in the RRC connected (e.g., RRC_CONNECTED) state before entering the RRC inactive (e.g., RRC_INACTIVE) state.

In some cases, the CG configuration may be provided in an RRC release message to configure the CG resources to the UE. For example, the UE in the RRC connected state may send a CG configuration request to the network as step S210 shown in FIG. 2. The CG configuration request sent by the UE may, for example, indicate the UE's preference for a configuration with CG Type 1 in the RRC inactive state. Once the network decides to move the UE to the RRC inactive state, the network may send an RRC release (e.g., RRCRelease) message with suspendConfig to the UE as step S220 shown in FIG. 2. The CG configuration may be, for example, included in the RRC release message with suspendConfig. In some cases, the UE may transit from the RRC connected state to the RRC inactive state in response to the reception of the RRC release message with suspendConfig.

In some cases, the CG configuration may be provided in an RRC reconfiguration message instead of the RRC release message when the UE is in the RRC connected state.

In some implementations, the UE may initiate a data transmission procedure in the RRC inactive state. For example, in a case that at least one condition for initiating a CG-based SDT procedure is met, the UE may initiate an SDT procedure as step S230 shown in FIG. 2. The at least one condition for initiating the CG-based SDT procedure may include at least one of the following:

UL data arrives at an RB/LCH configured for SDT.

The UE is configured with a valid PUSCH(s) (at the selected carrier, e.g., NUL or SUL) for performing CG-based SDT procedure.

In some implementations, a PUSCH for performing the CG-based SDT procedure may be considered valid when the PUSCH for the performing CG-based SDT procedure is not suspended/discarded/released/cleared. The UE may suspend/discard/release/clear a PUSCH for performing the CG-based SDT procedure if cg-SDT-TimeAlignmentTimer expires, the DL RSRP change exceeds a configured threshold since the previous TA update, and/or the measured DL RSRP from SSB that corresponds to the CG configuration/resource is below a configured threshold, etc., which is not limited herein.

In some implementations, a PUSCH for performing the CG-based SDT procedure may be considered valid if the RSRP has not increased by more than a configured threshold (e.g., a CG-SDT-RSRP-ChangeThresholdIncrease) when comparing to a stored DL reference RSRP value (since the previous TA update).

In some implementations, a PUSCH for performing the CG-based SDT procedure may be considered valid if the RSRP has not decreased by more than a configured threshold (e.g., a CG-SDT-RSRP-ChangeThresholdDecrease) when comparing to a stored DL reference RSRP value (since the previous TA update).

The total size of available small data for SDT is below a specific data volume threshold for the selection between (CG-based/RA-based) SDT procedure and non-SDT (e.g., normal RRC connection resume procedure/normal RA procedure). The total size of available small data may be the sum of all the available data from the RB(s)/LCH(s) configured for SDT and/or the sum of payload sizes of all the triggered MAC CEs.

In some implementations, the specific data volume threshold may be configured as a sdt-DataVolumeThreshold.

The measured DL RSRP is above a threshold that is used for selecting between a (CG-based/RA-based) SDT procedure or a normal RA procedure.

In some implementations, the threshold that is used for selecting between a (CG-based/RA-based) SDT procedure or a normal RA procedure may be configured by as a sdt-RSRP-Threshold.

It is noted that a UL resource (e.g., PUSCH) for performing the CG-based SDT procedure (e.g., a CG resource or a CG PUSCH) may be referred to as a UL resource of a CG configuration. In this case, the CG configuration may be used for performing the CG-based SDT procedure.

In some implementations, the RRC message for requesting an RRC state transition may be an RRC resume request message. It is noted that the RRC resume request message is transmitted on an UL resource of the CG configuration, which notifies the network at least one subsequent data transmission from the UE.

In step S520, the UE may transmit first uplink data to the network on an UL resource of the CG configuration.

In some implementations, the first uplink data may be small data.

In some implementations, the first uplink data in step S520 and the RRC resume request message in step S510 may be transmitted on the same UL resource of the CG configuration. For example, the first uplink data may correspond to the small data transmitted in step S240 of FIG. 2

In some implementations, the RRC resume request message may be transmitted on an UL resource of the CG configuration in step S510 and the first uplink data may be transmitted on another UL resource of the CG configuration in step S520. For example, the first uplink data may correspond to one of the at least one subsequent data transmitted in step S250 of FIG. 2

In step S530, the UE may start a timer upon transmitting on an UL resource of the CG configuration.

Specifically, the timer is corresponding to the CG configuration and started in response to each and every transmission on an UL resource of the CG configuration. At least one stop condition and at least one restart condition are configured for the timer such that the UE may operate the timer based on the configured conditions.

In some implementations, since the timer is started in response to each and every transmission on an UL resource of the CG configuration, the timer is (re) started upon second uplink data is transmitted on an UL resource of the CG configuration. The second uplink data may, for example, correspond to one of the subsequent data transmitted in step S250 of FIG. 2. That is, the at least one restart condition includes an uplink data is transmitted on an UL resource of the CG configuration while the timer is running.

In some implementations, the timer is configured to stop in response to at least one stop condition. The at least one stop condition includes a response that responding to the RRC message for requesting the RRC state transition is received. Specifically, once the UE receives a response that responding to the RRC message for requesting the RRC state transition, the UE may stop the running timer corresponding to the CG configuration.

For example, the RRC message for requesting the RRC state transition may include an RRC resume request message, and the response that responding to the RRC message for requesting the RRC state transition may include at least one of an RRC resume message, an RRC release message, RRC setup message and an RRC reject message.

In some implementations, the timer is configured to restart in response to at least one restart condition. The at least one restart condition includes: the first uplink data is retransmitted on a PUSCH scheduled via the PDCCH.

In some implementations, the timer in step S530 may be a CG SDT timer (e.g., cg-SDT timer). At least one stop condition and at least one restart condition of the CG SDT timer are detailly described in the previous paragraphs, which are not repeated herein.

In step S540, the UE may monitor a search space/CORESET/PDCCH from the network while the timer is running.

Specifically, the UE may monitor a search space/CORESET/PDCCH for possible transmission(s) of the specific response(s) while the timer is running. In other words, the timer started in step S530 may be, for example, configured to define a period for the UE to monitor the search space/CORESET/PDCCH.

In some implementations, information of the PDCCH may be included in the CG configuration, and the UE may monitor the specific PDCCH according to the CG configuration.

In some implementations, the UE may monitor the PDCCH based on the transmission of the uplink data while the timer is running. Specifically, the monitored PDCCH is determined based on the CG resource for transmitting the uplink data and the association between SSBs and CG resources. For example, the UE may transmit uplink data on a specific CG resource of the CG configuration, and the network may transmit PDCCH by using the SSB associated with the specific CG resource while the timer corresponding to the CG configuration is running.

In some implementations, by monitoring the PDCCH, the UE may receive a specific response which is DCI-based.

In some implementations, by monitoring the PDCCH, the UE may receive a DCI including an uplink scheduling which includes an uplink grant indicating a new transmission. In some implementations, an uplink grant indicating a new transmission is received is included in the at least one stop condition configured for stopping the timer started in step S530.

In some implementations, by monitoring the PDCCH, the UE may receive a DCI including a retransmission scheduling which including a PUSCH and perform a retransmission of a transmitted uplink data (e.g., first uplink data) on the PUSCH accordingly. In some implementations, a transmitted uplink data is retransmitted on a PUSCH scheduled by the PDCCH is included in the at least one of restart condition for restarting the timer started in step S530.

In some implementations, by monitoring the PDCCH, the UE may receive a DCI including a downlink assignment. In other words, the UE may receive a PDCCH that schedules a PDSCH. In this case, the UE may monitor the PDSCH scheduled by the PDCCH for monitoring the specific response.

In some implementations, by monitoring the PDSCH, the UE may receive a specific response which is MAC-CE-based or RRC message-based.

In some implementations, the RRC message-based specific response may be an RRC release message (with or without suspendConfig), an RRC setup message, an RRC reject message, or an RRC resume message.

In some implementations, by monitoring the PDSCH, the UE may receive an RRC message which is a response for responding the RRC message requesting the RRC state transition transmitted in step S510.

In a case that the RRC message received by monitoring the PDSCH is an RRC resume message, the UE may stop time timer, end the data transmission procedure, and transit to the RRC connected state.

In a case that the RRC message received by monitoring the PDSCH is an RRC release message with suspendConfig, the UE may stop time timer, end the data transmission procedure, and stay in the RRC inactive state.

In a case that the RRC message received by monitoring the PDSCH is an RRC release message without suspendConfig, the UE may stop time timer, end the data transmission procedure, and transit to the RRC idle state.

Said specific responses are detailly described in the previous paragraphs, which are not repeated herein.

In a case that the timer is running, the UE may operate (e.g., stop or (re) start) the timer in response to the at least one stop condition and the at least one restart condition, and step S550 is not performed. In a case that the timer expires, step S550 is performed.

In step S550, the UE may determine the transmission on the UL resource of the CG configuration corresponding to the timer fails.

Specifically, the UE is expected to receive a response with respect to each transmission on the UL resource of the CG configuration. In a case that the response is not received in a predetermined period, the corresponding transmission may be considered to be failed.

In some implementations, in a case that the UE determines that a transmission on an UL resource of the CG configuration corresponding to the timer fails, the UE may perform retransmission on a next available UL resource of the CG configuration.

Advantageously, power saving of a UE can be achieved by performing CG-based data transmissions (e.g., CG-based SDT) in an RRC inactive state and setting a timer for defining a period to monitor a search space/CORESET/PDCCH with respect to each transmission on an UL resource of the CG configuration.

Figure 6:
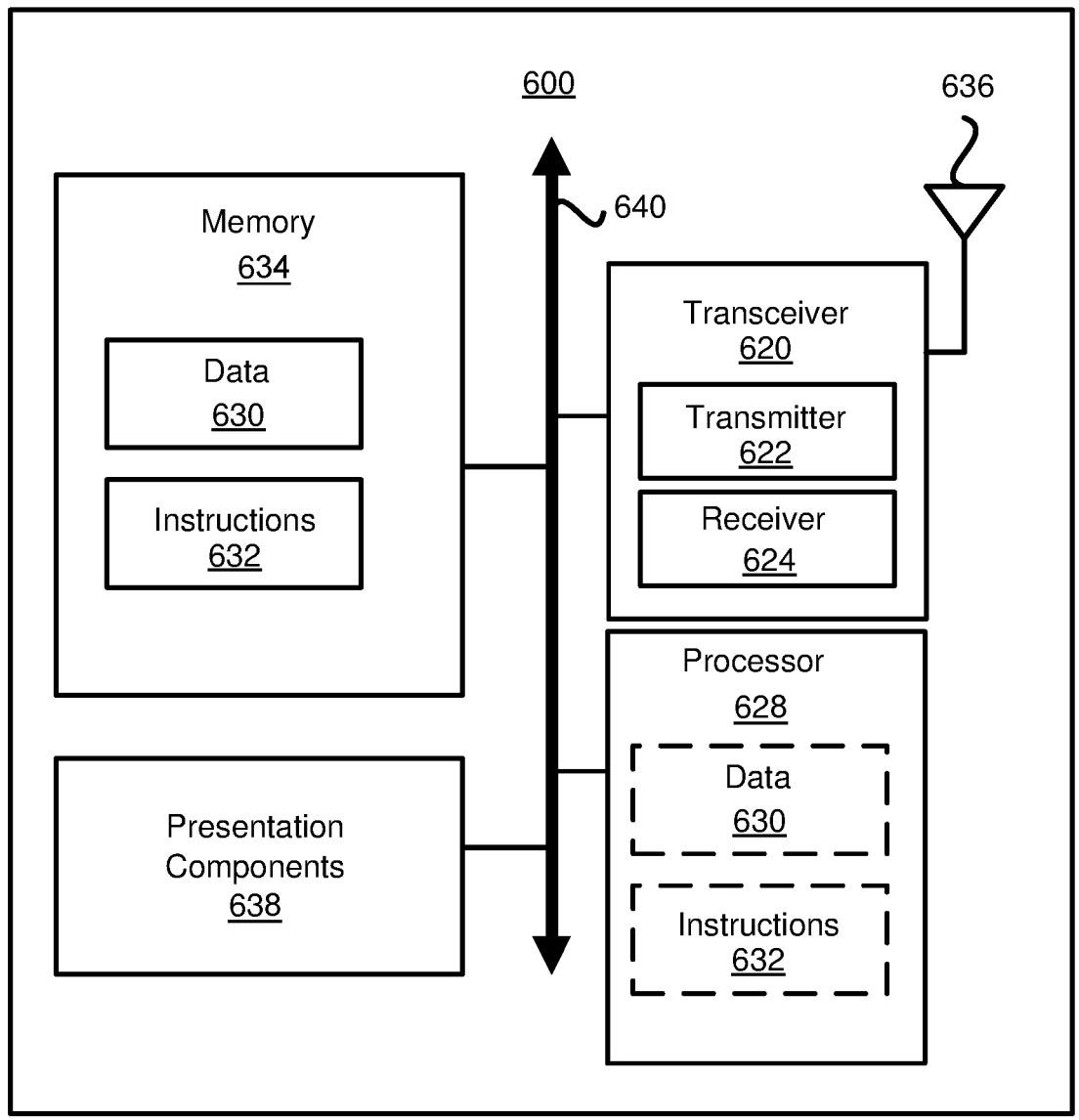
FIG. 6 is a block diagram illustrating a node for wireless communication according to an example implementation of the present application.

FIG. 6 is a block diagram illustrating a node for wireless communication according to an example implementation of the present application. As illustrated in FIG. 6, the node 600 may include a transceiver 606, a processor 608, a memory 602, one or more presentation components 604, and at least one antenna 610. The node 600 may also include an RF spectrum band module, a BS communications module, a network communications module, and a system communications management module, Input/Output (I/O) ports, I/O components, and a power supply (not explicitly illustrated in FIG. 6). Each of these components may be in communication with each other, directly or indirectly, over one or more buses 624. In some implementations, the node 600 may be a UE or a BS that performs various functions described herein, for example, with reference to FIGS. 1 through 8.

The transceiver 606 having a transmitter 616 (e.g., transmitting/transmission circuitry) and a receiver 618 (e.g., receiving/reception circuitry) may be configured to transmit and/or receive time and/or frequency resource partitioning information. In some implementations, the transceiver 606 may be configured to transmit in different types of subframes and slots, including, but not limited to, usable, non-usable and flexibly usable subframes and slot formats. The transceiver 606 may be configured to receive data and control channels.

The node 600 may include a variety of computer-readable media. Computer-readable media can be any available media that can be accessed by the node 600 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 602 may include computer storage media in the form of volatile and/or non-volatile memory. The memory 602 may be removable, non-removable, or a combination thereof. For example, the memory 602 may include solid-state memory, hard drives, optical-disc drives, etc. As illustrated in FIG. 6, the memory 602 may store computer-readable and/or computer-executable instructions 614 (e.g., software code(s) or computer-executable program(s)) that are configured to, when executed, cause the processor 608 to perform various functions described herein, for example, with reference to FIGS. 1 through 8. Alternatively, the instructions 614 may not be directly executable by the processor 608 but may be configured to cause the node 600 (e.g., when compiled and executed) to perform various functions described herein.

The processor 608 (e.g., having processing circuitry) may include an intelligent hardware device, a Central Processing Unit (CPU), a microcontroller, an ASIC, etc. The processor 608 may include memory. The processor 608 may process the data 612 and the instructions 614 received from the memory 602, and information through the transceiver 606, the baseband communications module, and/or the network communications module. The processor 608 may also process information to be sent to the transceiver 606 for transmission through the antenna 610, to the network communications module for transmission to a CN.

One or more presentation components 604 may present data indications to a person or other devices. Examples of presentation components 604 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE) for data transmission, the method comprising:
   transmitting a radio resource control (RRC) message to a base station for requesting an RRC state transition, the RRC message transmitted on a first uplink (UL) resource of a configured grant (CG) configuration;
   transmitting first uplink data to the base station on a second UL resource of the CG configuration;
   starting a timer upon transmitting the first uplink data on the second UL resource of the CG configuration;
   monitoring a physical downlink control channel (PDCCH) for a response from the base station while the timer is running;
   stopping the timer in response to at least one stop condition being satisfied; and
   restarting the timer in response to at least one restart condition being satisfied,
   wherein:
      the at least one stop condition comprises receiving the response, and
      the at least one restart condition comprises retransmitting the first uplink data on a physical uplink shared channel (PUSCH) scheduled by the PDCCH or transmitting second uplink data on a third UL resource of the CG configuration.

2. The method of claim 1, further comprising, before transmitting the RRC message:
   receiving an RRC release message comprising the CG configuration; and
   transitioning from an RRC connected state to an RRC inactive state after receiving the RRC release message.

3. The method of claim 1, wherein monitoring the PDCCH for the response from the base station while the timer is running comprises:
   receiving information, via the PDCCH, scheduling a physical downlink shared channel (PDSCH); and
   monitoring the PDSCH for receiving the response.

4. The method of claim 1, wherein the at least one stop condition further comprises:
   receiving an uplink grant via the PDCCH, the uplink grant indicating a new transmission.

5. The method of claim 1, wherein the response comprises at least one of an RRC resume message, an RRC release message, an RRC setup message, or an RRC reject message.

6. The method of claim 1, wherein the RRC message for requesting the RRC state transition comprises an RRC resume request message.

7. The method of claim 1, further comprising:
   determining that the transmission of the first uplink data on the second UL resource of the CG configuration corresponding to the timer has failed in a case that the timer expires.

8. A User Equipment (UE), comprising:
   at least one processor; and
   at least one non-transitory computer-readable medium storing one or more computer-executable instructions that, when executed by the at least one processor, cause the UE to:
      transmit a radio resource control (RRC) message to a base station for requesting an RRC state transition, the RRC message transmitted on a first uplink (UL) resource of a configured grant (CG) configuration;
      transmit first uplink data to the base station on a second UL resource of the CG configuration;
      start a timer upon transmitting the first uplink data on the second UL resource of the CG configuration;
      monitor a physical downlink control channel (PDCCH) for a response from the base station while the timer is running;
      stop the timer in response to at least one stop condition being satisfied; and
      restart the timer in response to at least one restart condition being satisfied,
      wherein:
         the at least one stop condition comprises receiving the response, and
         the at least one restart condition comprises retransmitting the first uplink data on a physical uplink shared channel (PUSCH) scheduled by the PDCCH or transmitting second uplink data on a third UL resource of the CG configuration.

9. The UE of claim 8, wherein the one or more computer-executable instructions, when executed by the at least one processor, further cause the UE to, before transmitting the RRC message:
   receive an RRC release message comprising the CG configuration; and
   transition from an RRC connected state to an RRC inactive state after receiving the RRC release message.

10. The UE of claim 8, wherein monitoring the PDCCH for the response from the base station while the timer is running comprises:
    receiving information, via the PDCCH, scheduling a physical downlink shared channel (PDSCH); and
    monitoring the PDSCH for receiving the response.

11. The UE of claim 8, wherein the at least one stop condition further comprises:
    receiving an uplink grant via the PDCCH, the uplink grant indicating a new transmission.

12. The UE of claim 8, wherein the response comprises at least one of an RRC resume message, an RRC release message, an RRC setup message, or an RRC reject message.

13. The UE of claim 8, wherein the RRC message for requesting the RRC state transition comprises an RRC resume request message.

14. The UE of claim 8, wherein the one or more computer-executable instructions, when executed by the at least one processor, further cause the UE to:
    determine that the transmission of the first uplink data on the second UL resource of the CG configuration corresponding to the timer has failed in a case that the timer expires.

* * * * *